United States Patent
Kendapadi et al.

(10) Patent No.: US 12,355,887 B2
(45) Date of Patent: Jul. 8, 2025

(54) PROOF OF PRESENCE USING NON-FUNGIBLE TOKENS

(71) Applicant: Wells Fargo Bank, N.A., San Francisco, CA (US)

(72) Inventors: Ananth Kendapadi, Charlotte, NC (US); Himanshu Baral, Fremont, CA (US); Rameshchandra Bhaskar Ketharaju, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 293 days.

(21) Appl. No.: 18/056,946

(22) Filed: Nov. 18, 2022

(65) Prior Publication Data

US 2024/0171398 A1     May 23, 2024

(51) Int. Cl.
    *H04L 9/40*          (2022.01)
    *H04L 9/32*          (2006.01)

(52) U.S. Cl.
    CPC .......... *H04L 9/3213* (2013.01); *H04L 9/3297* (2013.01); *H04L 2209/60* (2013.01)

(58) Field of Classification Search
    CPC ....... H04L 9/3213; H04L 9/3297; H04L 9/50; H04L 2209/60
    See application file for complete search history.

(56) References Cited

U.S. PATENT DOCUMENTS

| | | | |
|---|---|---|---|
| 10,832,522 B2 | 11/2020 | Simons | |
| 2019/0178672 A1* | 6/2019 | Woolley | G01C 21/3415 |
| 2020/0322154 A1 | 10/2020 | Konda et al. | |
| 2021/0150626 A1 | 5/2021 | Robotham | |
| 2021/0398141 A1* | 12/2021 | Benkreira | H04W 12/72 |
| 2022/0374902 A1* | 11/2022 | Sabintsev | G06Q 20/3676 |
| 2023/0019250 A1* | 1/2023 | Lee | G06F 21/32 |
| 2024/0091653 A1* | 3/2024 | Kanaujia | A63F 13/792 |
| 2024/0106649 A1* | 3/2024 | Berry | H04L 9/3226 |

* cited by examiner

*Primary Examiner* — Thaddeus J Plecha
(74) *Attorney, Agent, or Firm* — K&L Gates LLP

(57) ABSTRACT

Systems, apparatus, and computer program products are disclosed for generating a verification non-fungible token. An example method includes receiving an event generation request and in response to receiving the event generation request, capturing an asset position and a timestamp. The method further includes performing one or more authentication operations on the event generation request based on the asset identifier and the one or more authentication credentials. The method further includes, in an instance in which the one or more authentication operations authenticates the event generation request, generating the verification non-fungible token for the asset identifier and storing the verification non-fungible token in an associated distributed ledger.

20 Claims, 18 Drawing Sheets

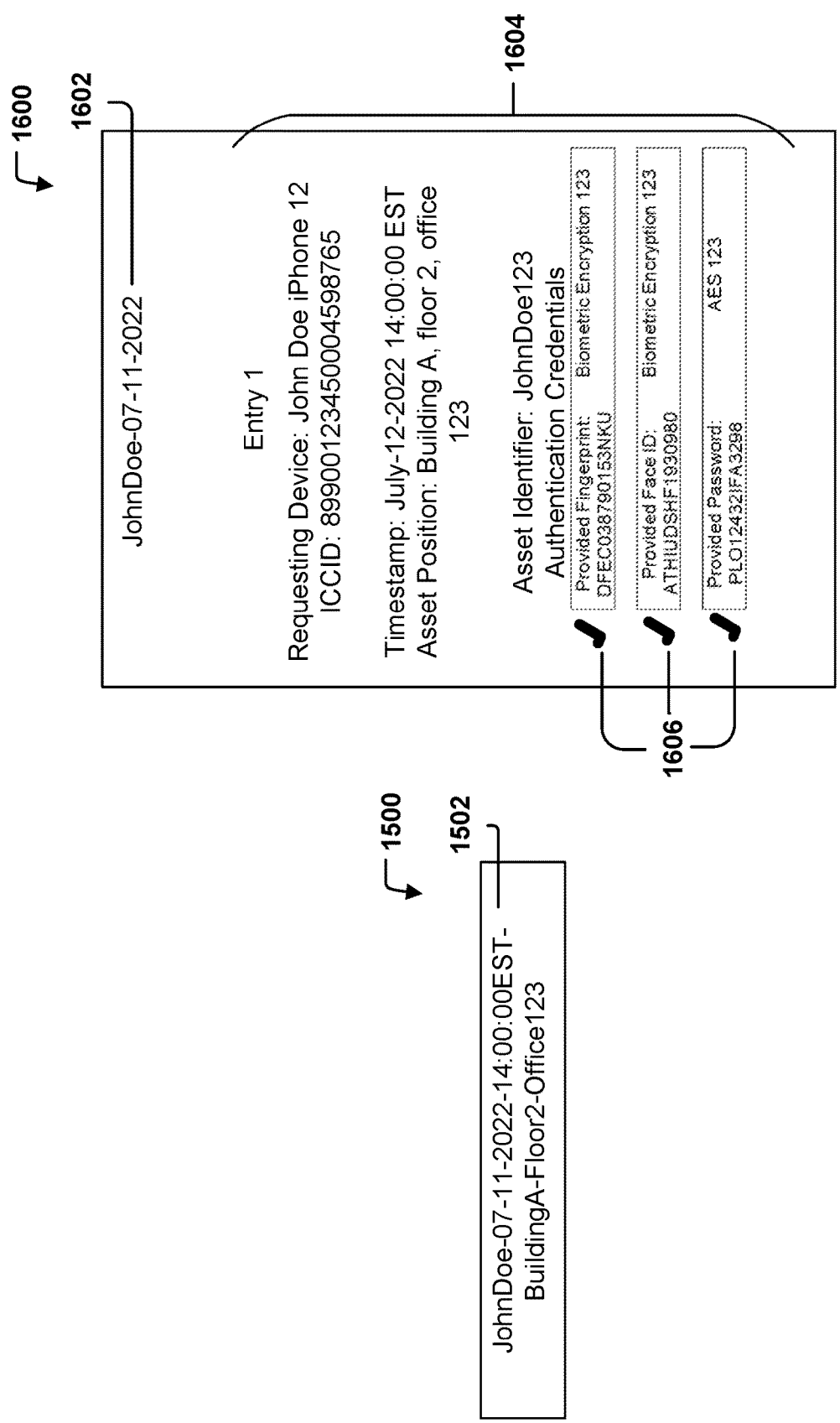

PROOF OF PRESENCE USING NON-FUNGIBLE TOKENS

TECHNOLOGICAL FIELD

Example embodiments of the present disclosure relate generally to establishing an asset proof of presence and, more particularly, to systems and methods which establish an asset proof of presence using verification non-fungible tokens and/or travel non-fungible tokens.

BACKGROUND

Current asset proof of presence processes may use asset authentication processes to establish an asset presence at a particular time and place. Each asset authentication outcome may be stored on a respective system using various storage methods.

BRIEF SUMMARY

Currently, there is no standard method or centralized system for proving the presence of an asset (e.g., an individual, an item, etc.) at a specific time and place. Typically, such authentication measures rely on the use of a single asset authentication triggered manually by a user. These authentication measures further rely on authentication factors which may include something a user has (e.g., cards, keys, etc.), something a user knows (e.g., password, personal identification number (PIN)), something a user is (e.g., biometric data), and/or somewhere a user is (e.g., connection to a specific computing network). However, while these systems may serve to authenticate a user in the short term, these systems do not reliably keep track of asset authentications over time and therefore it may be difficult to establish the presence of a user at various locations over time.

Furthermore, the variability within the various authentication processes within disparate systems make it difficult to establish a full picture of asset location over time. For example, an asset may be authenticated at an ATM with a known location at a first time point and later log onto a communication network via a user device at a second time point. While these individual authentication processes may establish a proof of presence at the corresponding time point, the ATM may operate on a different communication network than the communication network the user device connected to. Thus, while these individual authentication processes may establish a proof of presence at the corresponding time point, it may be difficult to observe a complete view of an asset's location over time. Additionally, each system may store this data according to the corresponding system rules and regulations, which may vary between systems. As such, there is an associated risk of data tampering for systems with less stringent data storage procedures, thereby decreasing the reliability of the data to establish a proof of presence for the asset.

Systems, apparatuses, methods, and computer program products are disclosed herein for generating verification non-fungible tokens (NFTs) and/or travel NFTs which may be used to establish an asset proof of presence at a particular time and location. Example implementations disclosed herein lead to improvements in the operation of networked computing devices by providing a centralized system for securely generating, authenticating, and storing verification NFTs and/or travel NFTs. Additionally, implementations disclosed herein lead to improvements in the security and reliability of processes for establishing an asset proof of presence by leveraging the immutable nature of NFTs and performing authentication operations prior to generating verification NFTs. As such, only NFTs which are authenticated are generated and then stored on a distributed ledger, such as on a blockchain, where they cannot be modified or altered. Furthermore, some embodiments of the present disclosure ease the manual burden on assets by automatically generating event generation requests in response to a trigger event and/or automatically generating travel NFTs in response to an event generation trigger.

In particular, verification NFTs may include information for a particular event generation request which relates to a request to generate a verification NFT. The verification NFT may be generated in an instance in which one or more user credentials associated with a requesting user are authenticated. Travel NFTs may include information related to a particular time window (e.g., an 8 hour time window) such that information related to multiple event generation request, and/or verification NFTs, may be included in a travel NFT.

In one example embodiment, a method is provided for generating a verification non-fungible token. The method includes receiving, by communications hardware, an event generation request, wherein the event generation request comprises at least an asset identifier and one or more authentication credentials. The method further includes, in response to receiving the event generation request, capturing, by non-fungible token generation circuitry, an asset position and a timestamp. The method further includes performing, by authentication circuitry, one or more authentication operations on the event generation request based on the asset identifier and the one or more authentication credentials. The method further includes, in an instance in which the one or more authentication operations authenticates the event generation request. The method further includes generating, by the non-fungible token generation circuitry, the verification non-fungible token for the asset identifier. The method further includes storing, by the communications hardware, the verification non-fungible token in an associated distributed ledger In another example embodiment, an apparatus is provided for generating a verification non-fungible token. The apparatus includes communications hardware configured to receive an event generation request, wherein the event generation request comprises at least an asset identifier and one or more authentication credentials and in response to receiving the event generation request, store the verification non-fungible token in an associated distributed ledger. The apparatus further includes non-fungible token generation circuitry configured to, in response to receiving the event generation request, capture an asset position and a timestamp and in an instance in which one or more authentication operations authenticates the event generation request, generate the verification non-fungible token for the asset identifier. The apparatus further includes authentication circuitry configured to perform the one or more authentication operations on the event generation request based on the asset identifier and the one or more authentication credentials.

In another example embodiment, a computer program product is provided for requesting authentication of a user using a knowledge factor identification transaction with a challenge authentication token. The computer program product includes at least one non-transitory computer-readable storage medium storing software instructions that, when executed, cause an apparatus to receive an event generation request, wherein the event generation request comprises at least an asset identifier and one or more authentication credentials. The at least one non-transitory computer-readable storage medium storing software instructions that, when executed, further cause an apparatus to, in response to receiving the event generation request, capture by non-fungible token generation circuitry, an asset position and a timestamp. The at least one non-transitory computer-readable storage medium storing software instructions that, when executed, further cause an apparatus to perform one or more authentication operations on the event generation request based on the asset identifier and the one or more authentication credentials. The at least one non-transitory computer-readable storage medium storing software instructions that, when executed, further cause an apparatus to generate the verification non-fungible token for the asset identifier in an instance in which the one or more authentication operations authenticates the event generation request and store the verification non-fungible token in an associated distributed ledger.

In another example embodiment, a method is provided for generating a verification non-fungible token. The method includes processing, by communications hardware, an event generation request triggered by a user, wherein the event generation request comprises at least an asset identifier and one or more authentication credentials. The method further includes, in response to receiving the event generation request, capturing, by non-fungible token generation circuitry, an asset position and a timestamp. The method further includes performing, by authentication circuitry, one or more authentication operations on the event generation request based on the asset identifier and the one or more authentication credentials. The method further includes, in an instance in which the one or more authentication operations authenticates the event generation request. The method further includes generating, by the non-fungible token generation circuitry, the verification non-fungible token for the asset identifier. The method further includes providing, by the communications hardware, the verification non-fungible token for storage in an associated distributed ledger.

In another example embodiment, an apparatus is provided for generating a verification non-fungible token. The apparatus includes communications hardware configured to process an event generation request triggered by a user, wherein the event generation request comprises at least an asset identifier and one or more authentication credentials and provide the verification non-fungible token for storage in an associated distributed ledger. The apparatus further includes non-fungible token generation circuitry configured to, in response to receiving the event generation request, capture an asset position and a timestamp and in an instance in which one or more authentication operations authenticates the event generation request, generate the verification non-fungible token for the asset identifier. The apparatus further includes authentication circuitry configured to perform the one or more authentication operations on the event generation request based on the asset identifier and the one or more authentication credentials.

In another example embodiment, a computer program product is provided for requesting authentication of a user using a knowledge factor identification transaction with a challenge authentication token. The computer program product includes at least one non-transitory computer-readable storage medium storing software instructions that, when executed, cause an apparatus to process an event generation request triggered by a user, wherein the event generation request comprises at least an asset identifier and one or more authentication credentials. The at least one non-transitory computer-readable storage medium storing software instructions that, when executed, further cause an apparatus to, in response to receiving the event generation request, capture by non-fungible token generation circuitry, an asset position and a timestamp. The at least one non-transitory computer-readable storage medium storing software instructions that, when executed, further cause an apparatus to perform one or more authentication operations on the event generation request based on the asset identifier and the one or more authentication credentials. The at least one non-transitory computer-readable storage medium storing software instructions that, when executed, further cause an apparatus to, in an instance in which the one or more authentication operations authenticates the event generation request generate the verification non-fungible token for the asset identifier and provide the verification non-fungible token for storage in an associated distributed ledger.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

FIG. 15 provides an operational example of a verification non-fungible token, in accordance with some example embodiments described herein.

FIG. 16 provides an operational example of a travel non-fungible token, in accordance with some example embodiments described herein.

DETAILED DESCRIPTION

Figure 1:
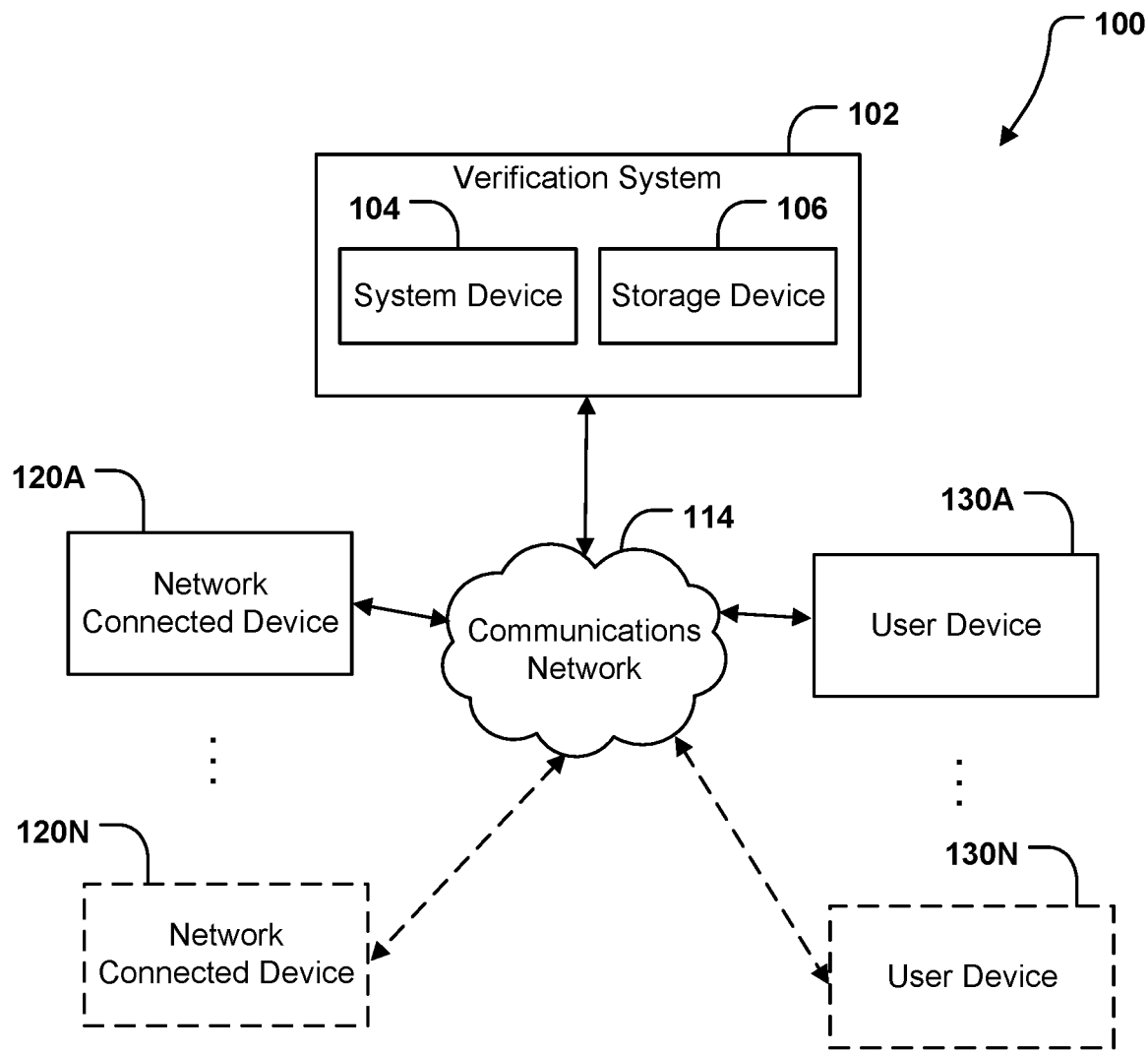
FIG. 1 illustrates a system in which some example embodiments may be used generating a verification non-fungible token, in accordance with some example embodiments described herein.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

Definition of Certain Terms

The terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

The term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The terms "client device," "mobile device," "electronic device," "user device" and the like refer to computer hardware that is configured (either physically or by the execution of software) to communicate with the verification system and/or network connected device(s) to provide an event generation request and/or provide a verification NFT and, among various other functions, is configured to directly, or indirectly, transmit and receive data. In some embodiments, the user device may be configured to provide an event generation request and proof of presence request. In some embodiments, the user device is configured to receive the event generation request, capture an asset position and timestamp, perform one or more authentication operations, generate the verification NFT, and provide the NFT for storage on distributed ledger. Example user devices may include a smartphone, a tablet computer, a laptop computer, a wearable device (e.g., smart glasses, smart watch, or the like), and the like. In some embodiments, a user device may include a "smart device" that is equipped with a chip or other electronic device that is configured to communicate with the apparatus via Bluetooth, NFC, Wi-Fi, 3G, 4G, 5G, RFID protocols, and the like.

The term "network connected device" and the like refer to computer hardware that is configured (either physically or by the execution of software) to communicate with the verification system and/or user devices to provide an event generation request and/or provide a verification NFT and, among various other functions, is configured to directly, or indirectly, transmit and receive data. In some embodiments, the network connected device may be configured to provide an event generation request and proof of presence request. In some embodiments, the user device is configured to receive the event generation request, capture an asset position and timestamp, perform one or more authentication operations, generate the verification NFT, and provide the NFT for storage on distributed ledger. In some embodiments, the network connected device may be associated with the verification system such that it may access information within the verification system (e.g., within a verification system storage device). In some embodiments, the network connected device may share a secure network connection with the verification system and/or be associated with the same entity. Example network connected devices may include a badge-in terminal, cameras, Bluetooth terminals, smartphone, a tablet computer, a laptop computer, a wearable device (e.g., smart glasses, smart watch, or the like), and the like. In some embodiments, a network connected device may include a "smart device" that is equipped with a chip or other electronic device that is configured to communicate with the apparatus via Bluetooth, NFC, Wi-Fi, 3G, 4G, 5G, RFID protocols, and the like The terms "system device," "verification system device," and the like refer to computer hardware associated with the verification system that is configured (either physically or by the execution of software) to communicate with user device(s) and/or network connected device(s) of a communication system and, among various other functions, is configured to directly, or indirectly, transmit and receive data. In some embodiments, the system device may be configured to receive an event generation request, capture an asset position and timestamp, perform one or more authentication operations, generate a verification NFT, store the verification NFT, and provide one or more NFTs in response to a proof of presence request. Example system devices may include a smartphone, a tablet computer, a laptop computer, a wearable device (e.g., smart glasses, smart watch, or the like), and the like. In some embodiments, a system device may include a "smart device" that is equipped with a chip or other electronic device that is configured to communicate with the apparatus via Bluetooth, NFC, Wi-Fi, 3G, 4G, 5G, RFID protocols, and the like. In some embodiments, the system device may act as a server device.

The term "event generation request" may refer to a data structure configured to indicate a request for the generation of a verification NFT. The event generation request may be generated by a network connected device or user device either automatically or manually. The event generation request may be triggered automatically in response to detection of a trigger event at the network connected device or user device (e.g., a badge swipe, walking by a Bluetooth terminal, etc.). Alternatively, a user may interact with the network connected device or user device via a user interface to manually trigger the event generation request. The event generation request may include an asset identifier and one or more authentication credentials. In some embodiments, the event generation request may further include an indication of a device identifier corresponding to the device (e.g., user device or network connected device) which generated the event generation request. In some embodiments, the event generation request may further include device coordinates corresponding to the device (e.g., user device or network connected device) which generated the event generation request. In some embodiments, the event generation request may further include a generation timestamp, indicative of when the date and time at the event generation request was generated by the user device or network connected device or received by a system device of the verification system. The event generation request may be received by a system device of the verification system and cause the system device to capture an asset position and timestamp. The captured timestamp may be the generation timestamp, indicative of when the date and time at the event generation request was generated by the user device or network connected device. Alternatively, the event generation request may be processed by the user device or network connected device, which generated the event generation request. The event generation request may be authenticated by the user device, the network connected device, or the system device of the verification system using one or more authentication operations.

The term "asset identifier" may refer to a data structure configured to uniquely identify each asset within a verification system. An asset may correspond to article for which a proof of presence is desired. The asset may be an individual such as a user, an item, an object, a package, and/or the like. An asset identifier may be a variable combination of alphanumeric characters are selected by an asset or assigned to an asset. The asset identifier may be associated with a particular asset profile within the verification system and may further be used to identify the corresponding asset profile. The asset identifier may be used by a system device of the verification system to query the storage for the asset profile. An asset profile may store information and/or data related to the asset, including sensitive information. In some embodiments, at least a portion of the information stored in the asset profile may be encrypted using one or more encryption techniques and/or tokenized using one or more tokenization techniques such that the information is protected. In some embodiments, at least a portion of the information is stored in hashed form. A hash function may be used to generate the hashed information. The hash function may be a one-way function configured to generate hashed values. In some embodiments, the hash function may also use a salt value to when generating the hashed information.

The term "authentication credential" may refer to a data structure that is associated with a particular asset identifier which may be used to confirm an asset's identity. In some embodiments, an authentication credential may be a password, biometric data (e.g., fingerprint, voice print, retina scan, face scan, etc.), device pattern data (e.g., swipe patterns, keyboard stroke patterns, etc.), or other asset identifying information. The asset profile of the associated asset may store the authentication credentials, which may be stored in an encrypted form and/or tokenized form.

The term "authentication operations" refers to a set of operations performed by one or more system devices on the event generation request in an attempt to verify the identity of the asset associated with the event generation request and requesting a verification NFT. In some embodiments, the authentication operations may include identifying an asset profile, determining an overall attribute similarity score, determining whether the overall attribute similarity score satisfies one or more overall attribute similarity score thresholds. In some embodiments, the overall attribute similarity score is determined based on a comparison of one or more of the one or more authentication credentials described by the event generation request and one or more stored credentials associated with an asset profile. In some embodiments, the overall attribute similarity score may be determined using an attribute similarity machine learning model, which may be part on an ensemble machine learning framework. In some embodiments, the overall attribute similarity score may be determined by determining a per-attribute similarity score by comparing each authentication credential included in the event generation request data object to a corresponding authentication credential stored in the asset profile and determining the overall attribute similarity score based on each per-attribute similarity score. In an instance the overall attribute similarity score satisfies the one or more overall attribute similarity score thresholds, the event generation request may be authenticated. In an instance the overall attribute similarity score fails to satisfy the one or more overall attribute similarity score thresholds, the event generation request may be denied authentication. In some embodiments, if the event generation request is denied authentication, one or more potential fraud alerts may be generated (e.g., by the user device, network connected device, or system device) and provided to one or more computing devices, such as a user device and/or one or more computing devices of authority users. As such, the user may be informed that the event generation request was not authenticated and no verification NFT was generated. Additionally, one or more authority users may be informed of attempt to generate a verification NFT such that potential identity fraud may be detected, and appropriate action may be taken.

The term "attribute similarity machine learning model" may refer to an electronically-stored data construct configured to describe parameters, hyperparameters, and/or stored operations of a machine learning model that is configured to process the event generation request to generate an overall attribute similarity score for the event generation request. In some embodiments, the attribute similarity machine learning model may be part of an ensemble machine learning framework, which may include a feature pre-processing layer and/or feature extraction layer and one or more per-attribute similarity machine learning models. The attribute similarity machine learning model may receive one or more per-attribute similarity scores from one or more per-attribute similarity machine learning models and generate the overall attribute similarity score for the event generation request based on the one or more per-attribute similarity scores. In particular, the attribute similarity machine learning model may aggregate each per-attribute similarity score, such as by determining a weighted average, and in some embodiments, use an accuracy indication measure to determine the overall attribute similarity score. Each per-attribute similarity score may be weighted according to an associated confidence score. The confidence score may be determined based on the associated per-attribute similarity machine learning model which generated the per-attribute similarity score. The confidence score may be indicative of the value of confidence placed in a particular authentication credential for accurately identifying an asset. The accuracy indication measure may be determined based on the number of authentication credentials which are provided by the event generation request. Alternatively, the attribute similarity machine learning model may be configured to generate the overall attribute similarity score by processing the one or more authentication credentials (e.g., without the use of the per-attribute similarity machine learning models). In some embodiments, the overall attribute similarity score is determined based on a comparison of one or more of the one or more authentication credentials described by the event generation request and one or more stored credentials associated with an asset profile. In some embodiments, the attribute similarity machine learning model may be configured to determine whether the overall attribute similarity score satisfies one or more overall attribute similarity score thresholds. In some embodiments, the overall attribute similarity score may output an authentication status, which may be a binary value (e.g., 0 or 1) and may be indicative of whether the event generation request is authenticated. The attribute similarity machine learning model may be a trained neural network, such as a convolution neural network (CNN).

The term "per-attribute similarity machine learning model" may refer to an electronically-stored data construct configured to describe parameters, hyperparameters, and/or stored operations of a machine learning model that is configured to process an authentication credential described in the event generation request which corresponds to an authentication credential type to generate a per-attribute similarity score for the authentication credential. Each per-attribute similarity machine learning model may be configured to process an authentication credential of a particular type and generate a per-attribute similarity score for the corresponding authentication credential. In some embodiments, a per-attribute similarity score may be a binary value (e.g., 0 or 1) and may be indicative of whether the particular authentication credential is authenticated. In some embodiments, a per-attribute similarity score may be a numerical value (e.g., number, percentage, etc.) and may be indicative of how closely the particular authentication credential matched a stored authentication credential. In some embodiments, the per-attribute similarity machine learning model may be part of an ensemble machine learning framework, which may include a feature pre-processing layer and/or feature extraction layer and an attribute similarity machine learning model. A per-attribute similarity may be configured to receive a processed and/or extracted authentication credential from a pre-processing layer and process the authentication credential to generate the per-attribute similarity score. The per-attribute similarity score for an authentication credential may be determined by comparing each authentication credential extracted from the event generation request data object to a corresponding authentication credential stored in the asset profile. The per-attribute similarity score may be provided to an attribute similarity machine learning model. Each per-attribute similarity machine learning model may be a trained neural network, such as a convolution neural network (CNN).

The terms "verification non-fungible token", "verification NFT", or the like may refer to a data structure which is associated with a particular asset identifier and may be configured to describe asset details, such as the asset location at a particular time. In particular, a verification NFT may include information for a particular event generation request which relates to a request to generate a verification NFT. The verification NFT may be generated in an instance one or more user credentials associated with a requesting user are authenticated. In some embodiments, the verification NFT may be used for proof of presence for the asset corresponding to the asset identifier. The verification NFT may be a uniquely identifiable from other verification NFTs such that it is non-fungible. The verification NFT may be associated with a particular owner, who may control the permissions, rights, distribution, etc. of the verification NFT. In some embodiments, the verification NFT is owned by a user associated with the asset identifier. The verification NFT may generated by a user device, network connected device, or system device in response to authentication of the event generation request. The verification NFT may have a structure which includes a header and a payload. The verification NFT header may be used to uniquely identify the verification NFTs from other verification NFTS. In some embodiments, the payload of the verification NFT is blank. Alternatively, the verification NFT payload may include the asset position, the asset identifier, and the timestamp associated with the event generation request. In some embodiments, the verification NFT payload may further include the one or more authentication credentials or an indication of the one or more authentication credentials. In some embodiments, the one or more authentication credentials may be encrypted using one or more encryption techniques. In some embodiments, the verification NFT payload may include an indication of whether the authentication credential was authenticated. In some embodiments, the one or more authentication credentials may be tokenized using one or more tokenization techniques The verification NFT may be stored in a distributed ledger, such as on a blockchain. The verification NFT may be immutable once it is stored in the distributed ledger.

The term "distributed ledger" may refer to a database that is consensually shared and synchronized across multiple sites, institutions, or geographies. The distributed ledger may be maintained using a peer-to-peer (P2P) computer network and consensus algorithms to allow the ledger to be replicated across distributed computer nodes. In some embodiments, the distributed ledger is a blockchain. The distributed ledger may use a proof of work (PoW) consensus or proof of stake consensus (PoS). The distributed ledger may be public or private. The computer network which maintains the distributed ledger may include one or more of the user devices, network-connected device, and/or system device as nodes configured to store ledger data. In some embodiments, the distributed ledger may be maintained using multiple system devices of the verification system.

The term "block" refers to a data structure associated with a blockchain. For example, a block may comprise a model definition data structure, a block header data structure, a technical data structure, a business data structure, an operational data structure, a next block information data structure, any other suitable electronic information or data structure associated therewith (including, but not limited to, links or pointers), or any combination thereof. A block header data structure may comprise a current block hash value data structure, a previous block hash value data structure, a next block hash value data structure, a Merkle root hash value data structure, a nonce value data structure, any other suitable electronic information or data structure associated therewith (including, but not limited to, links or pointers), or any combination thereof.

The term "blockchain" may refer to a digital ledger which includes an expandable list of blocks. For example, a blockchain may include a plurality of blocks, any other suitable electronic information or data structure associated therewith (including, but not limited to, links or pointers), or any combination thereof.

The term "node device" or "node" may refer to a computing device, such as a server device, client device, a database server device, a data storage device, or a blockchain data storage device that stores one or more portions of a blockchain. For example, a node device may comprise a server device, a client device, a database, a database server device, any other suitable device or data structure associated therewith (including, but not limited to, links or pointers), or any combination thereof.

The term "smart contract" may refer to any code usable to perform changes in a blockchain or to carry some process in the blockchain. For example, a smart contract may comprise one or more blockchain-based data structures that digitally facilitate, verify, or enforce the negotiation or performance of a contract between parties.

The term "requesting device map database" may refer to a database configured to identify network-connected device locations based on a respective device identifier. Each network-connected device may be associated with a unique device identifier (e.g., an integrated circuit card identifier (ICCID), unique device identifiers (UDID), etc.) and each network-connected device may be associated with a particular location within a corresponding facility. The location of the network-connected device may correspond to a physical location where the network-connected device is installed. The location within a facility may correspond to a room, portion of a room, floor level, or other facility location description.

The term "proof of presence request" may refer to a data structure configured to request one or more verification NFTs associated with an asset identifier for a particular time period. The proof of presence request may be generated and provided by a user device or other computing device and be processed by a system device of the verification system. The proof of presence request may include indication of the asset identifier and a time range. In some embodiments, the proof of presence request may include one or more authentication credentials. The one or more authentication credentials may be used to verify the identity of the requesting user and ensure the requesting user is authorized to view or otherwise access the one or more verification NFTs and/or travel NFTs. Each verification NFT and travel NFT may be associated with full or partial ownership from one or more users, who may control these permissions.

The term "potential fraud alert" may refer to a data structure configured to indicate a potentially fraudulent event generation request. The potential fraud alert may be generated by the user device, network connected device, or system device in an instance the event generation request fails to be authenticated. The potential fraud alert may indicate information related to the event generation request such as the associated asset identifier, the captured asset position and timestamp, a reason for authentication failure, etc. The potential fraud alert may be provided to one or more computing devices, such as a user device and/or one or more computing devices of authority users. As such, the user may be informed that the event generation request was not authenticated and no verification NFT was generated. Additionally, one or more authority users may be informed of attempt to generate a verification NFT such that potential identity fraud may be detected, and appropriate action may be taken.

The terms "travel non-fungible token" or "travel NFTs" or the like may refer to a data structure which is associated with a particular asset identifier and may be configured to describe asset details, such as the asset location over a given time window. In particular, travel NFTs may include information related to a particular time window (e.g., an 8 hour time window) such that information related to multiple event generation request and/or verification NFTs may be included in a travel NFT. Travel NFTs may be generated by a user device or system device, which may temporarily store received event generation requests and data related to event generation request (e.g., authentication status, overall attribute similarity score, per-attribute similarity score, etc.) associated with an asset identifier over the given time window to generate the travel NFT. In some embodiments, a travel NFT may be used for proof of presence for the asset corresponding to the asset identifier as well as provide a summary of asset location and/or authentication status for the given time window. The travel NFT may be a uniquely identifiable from other travel NFTs such that it is non-fungible. The travel NFT may be associated with a particular owner, who may control the permissions, rights, distribution, etc. of the travel NFT. In some embodiments, the travel NFT is owned by the user associated with the asset identifier. The travel NFT may generated by a user device or system device in response to an event generation trigger. Travel NFTs may be generated periodically or semi-periodically in response to an event generation trigger, which may be automatically generated by the user device or system device. An event generation trigger may be generated every 8 hours, 24 hours, and/or the like. The travel NFT may have a structure which includes a header and a payload. The travel NFT header may be used to uniquely identify the travel NFTS from other travel NFTS. The travel NFT payload may include the asset position, the asset identifier, and the timestamp associated with each event generation request corresponding to an asset identifier over the given time window. In some embodiments, the travel NFT payload may further include the one or more authentication credentials or an indication of the one or more authentication credentials. In some embodiments, the one or more authentication credentials may be encrypted using one or more encryption techniques. In some embodiments, the travel NFT payload may include an indication of whether the authentication credential was authenticated. In some embodiments, the one or more authentication credentials may be tokenized using one or more tokenization techniques The travel NFT may be stored in a distributed ledger, such as on a blockchain. The travel NFT may be immutable once it is stored in the distributed ledger.

Overview

As noted above, currently there is no standard method or centralized system for proving the presence of an asset (e.g., an individual, an item, etc.) at a specific time and place. Typically, such authentication measures rely on the use of a single asset authentication triggered manually by a user. These authentication measures further rely on authentication factors which may include something an asset has (e.g., cards, keys, etc.), something an asset knows (e.g., password, personal identification number (PIN)), something an asset is (e.g., biometric data), and/or somewhere an asset is (e.g., connection to a specific computing network). However, while these systems may serve to authenticate the asset in the short term, these systems do not reliably keep track of asset authentications over time and therefore it may be difficult to establish the presence of an asset at various locations over time with such systems.

Furthermore, the variability within the various authentication processes within disparate systems make it difficult to establish a full picture of asset location over time. For example, an asset may be authenticated at an ATM with a known location at a first time point and later log onto a communication network via a user device at a second time point. While these individual authentication processes may establish a proof of presence at the corresponding time point, the ATM may operate on a different communication network than the communication network the user device connected to. Thus, while these individual authentication processes may establish a proof of presence at the corresponding time point, it may be difficult to observe a complete view of an asset's location over time. Additionally, each system may store this data according to the corresponding system rules and regulations, which may vary between systems. As such, there is an associated risk of data tampering for systems with less stringent data storage procedures, thereby decreasing the reliability of the data to establish a proof of presence for the asset.

Example embodiments described herein provide for a dynamic and reliable centralized system which may serve to establish a user proof of presence using verification NFTs and/or travel NFTs. An event generation request may be received or processed and include at least an asset identifier and one or more authentication credentials. One or more authentication procedures may be performed on the event generation request to authenticate the event generation request. In an instance the event generation request is authenticated, a verification NFT may be generated and stored in an associated distributed ledger. Additionally, a travel NFT may be generated periodically in response to an event generation trigger. The travel NFT may include a payload generated based on one or more verification NFTs which were generated within an associated time window, thereby establishing an asset history over a time window.

Accordingly, the present disclosure sets forth systems, methods, and apparatuses that achieve a centralized and secure process for establishing a user proof of presence. There are many advantages of these, and other embodiments described herein. For instance, the establishment of a centralized system may conserve bandwidth by eliminating the need to request user interaction data from multiple sources in order to establish a proof of presence. Additionally, implementations disclosed herein lead to improvements in the security and reliability of processes for establishing an asset proof of presence by leveraging the immutable nature of NFTs and performing authentication operations prior to generating verification NFTs. Furthermore, some embodiments of the present disclosure ease the manual burden on assets by automatically generating event generation requests in response to a trigger event and/or automatically generating travel NFTs in response to an event generation trigger.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment 100 within which various embodiments may operate. As illustrated, a verification system 102 may include a system device 104 in communication with a storage device 106. Although system device 104 and storage device 106 are described in singular form, some embodiments may utilize more than one system device 104 and/or more than one storage device 106. Additionally, some embodiments of the verification system 102 may not require a storage device 106 at all.

The verification system 102, its constituent system device 104 and/or storage device 106 may receive and/or transmit information via communications network 114 (e.g., the Internet) with any number of other devices, such as one or more of network connected devices 120A-120N and/or user devices 130A-130N.

The verification system 102 may be implemented as one or more servers, which may or may not be physically proximate to other components of the verification system 102. Furthermore, some components of the system device 104 may be physically proximate to the other components of the verification system 102 while other components are not.

The system device 104 may receive, process, generate, and transmit data, signals, and electronic information to facilitate the operations of the verification system 102. Particular components of system device 104 are described in greater detail below with reference to apparatus 200 in connection with FIG. 2.

The storage device 106 may comprise distinct components from system device 104 or may comprise elements of system device 104 (e.g., memory 204, as described below in connection with FIG. 2). The storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 114). The storage device 106 may host the software executed to operate the verification system 102. The storage device 106 may store information relied upon during operation of the verification system 102, such as various cryptographic keys that may be used by the verification system 102, password hash databases, or the like. In addition, storage device 106 may store control signals, device characteristics, and access credentials enabling interaction among the verification system 102, the one or more network connected devices 120A-120N, and the one or more user devices 130A-N.

In some embodiments, the storage device 106 may be configured to store one or more ensemble machine learning frameworks, which may include a feature pre-processing layer, one or more per-attribute similarity machine learning models, and an attribute similarity machine learning model. The storage device 106 may include training data which may be used to train and/or retrain the one or more per-attribute similarity machine learning models and the attribute similarity machine learning model.

The one or more network connected devices 120A-120N may be embodied by any computing devices known in the art, such as a badge-in terminal, cameras, Bluetooth terminals, smartphone, a tablet computer, a laptop computer, a wearable device, and/or the like. The one or more network connected devices 120A-120N need not themselves be independent devices but may be peripheral devices communicatively coupled to other computing devices. The network connected devices 120A-120N may be distinct devices from the verification system 102, however the network connected devices 120A-120N may be embodied in the same computing device as the verification system 102.

The one or more user devices 130A-130N may be embodied by any computing devices known in the art, such as a tablet computer, a laptop computer, a wearable device, and/or the like. The one or more user devices 130A-130N need not themselves be independent devices but may be peripheral devices communicatively coupled to other computing devices. The user devices 130A-130N may be distinct devices from the verification system 102, however the user devices 130A-130N may be embodied in the same computing device as the verification system 102.

The one or more network connected devices 120A-120N and/or one or more user devices 130A-130N may receive, process, generate, and transmit data, signals, and electronic information to facilitate the operations of the respective device. In some embodiments, the one or more network connected devices 120A-120N may be configured to access certain information of the verification system 102 and/or one or more user devices 130A-130N, such as via communications network 114. In some embodiments, the one or more user devices 130A-130N may be configured to access certain information of the verification system 102 and/or one or more network connected devices 120A-120N, such as via communications network 114. Although not shown, the one or more network connected devices 120A-120N and/or one or more user devices 130A-130N may be configured with an associated storage. Particular components of a network connected device and/or user device are described in greater detail below with reference to apparatus 300 in connection with FIG. 3.

Example Verification System Implementing Apparatus

Figure 2:
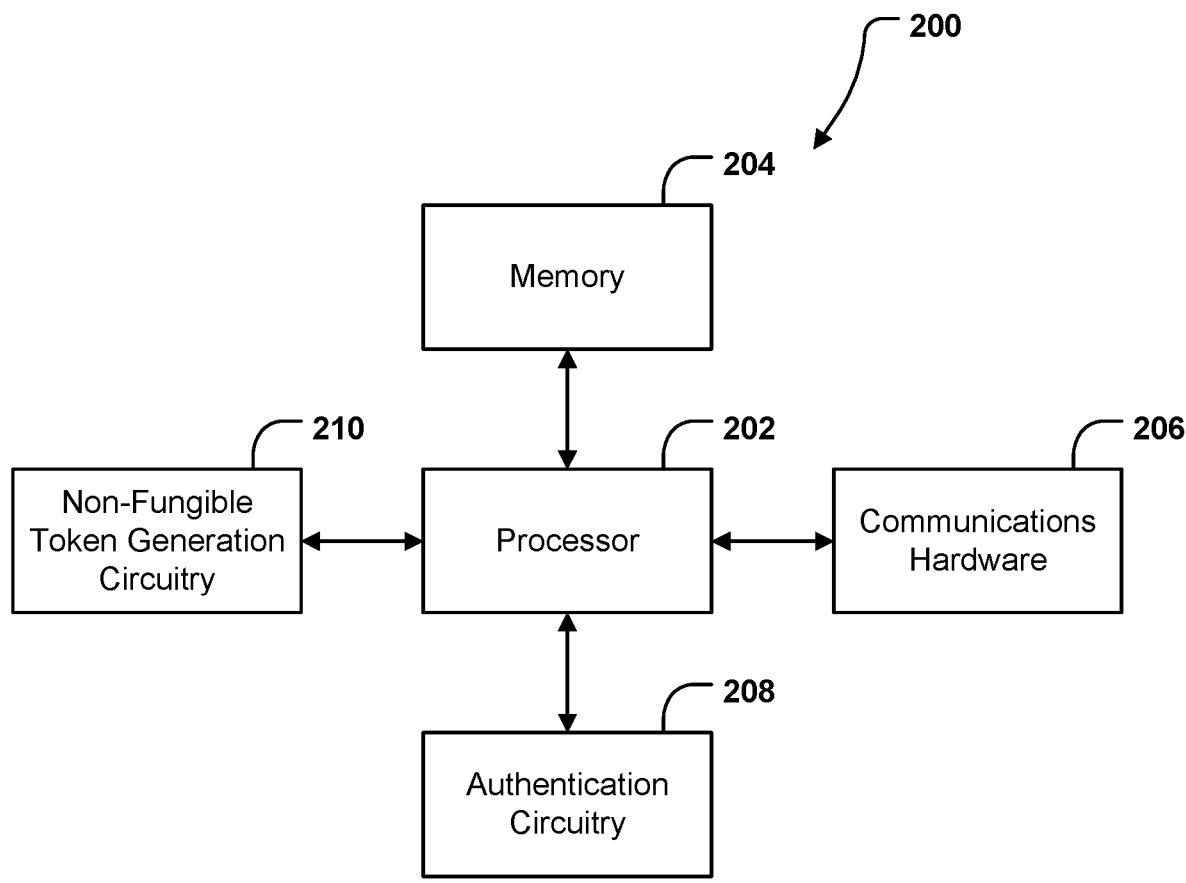
FIG. 2 illustrates a block diagram of example circuitry embodying a system device of a verification that may perform various operations in accordance with some example embodiments described herein.

The system device 104 of the verification system 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, authentication circuitry 208, and non-fungible token generation circuitry 210, each of which will be described in greater detail below. While the various components are only illustrated in FIG. 2 as being connected with apparatus 200, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection FIGS. 4-13.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

The memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may be configured to provide output to a user and, in some embodiments, to receive an indication of user input. The communications hardware 206 comprise a user interface, such as a display, and may further comprise the components that govern use of the user interface, such as a web browser, mobile application, dedicated user device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises an authentication circuitry 208 that authenticates an event generation request. The authentication circuitry 208 may utilize processor 202, memory 204, or any other hardware component included in the apparatus 200 to perform these operations, as described in connection with FIGS. 4-13 below. The authentication circuitry 208 may further utilize communications hardware 206 to gather data from a variety of sources or to receive data from a user, and in some embodiments may utilize processor 202 and/or memory 204 to authenticate the event generation request.

Additionally, the apparatus 200 may also comprise a non-fungible token generation circuitry 210 that generates a verification NFT and/or travel NFT. The non-fungible token generation circuitry 210 may utilize processor 202, memory 204, or any other hardware component included in the apparatus 200 to perform these operations, as described in connection with FIGS. 4-13 below. The non-fungible token generation circuitry 210 may further utilize communications hardware 206 to gather data from a variety of sources or to receive data from a user, and in some embodiments may utilize processor 202 and/or memory 204 to tokenize, encrypt, or decrypt data.

Example Network Connected Device or User Device Implementing Apparatus

Figure 3:
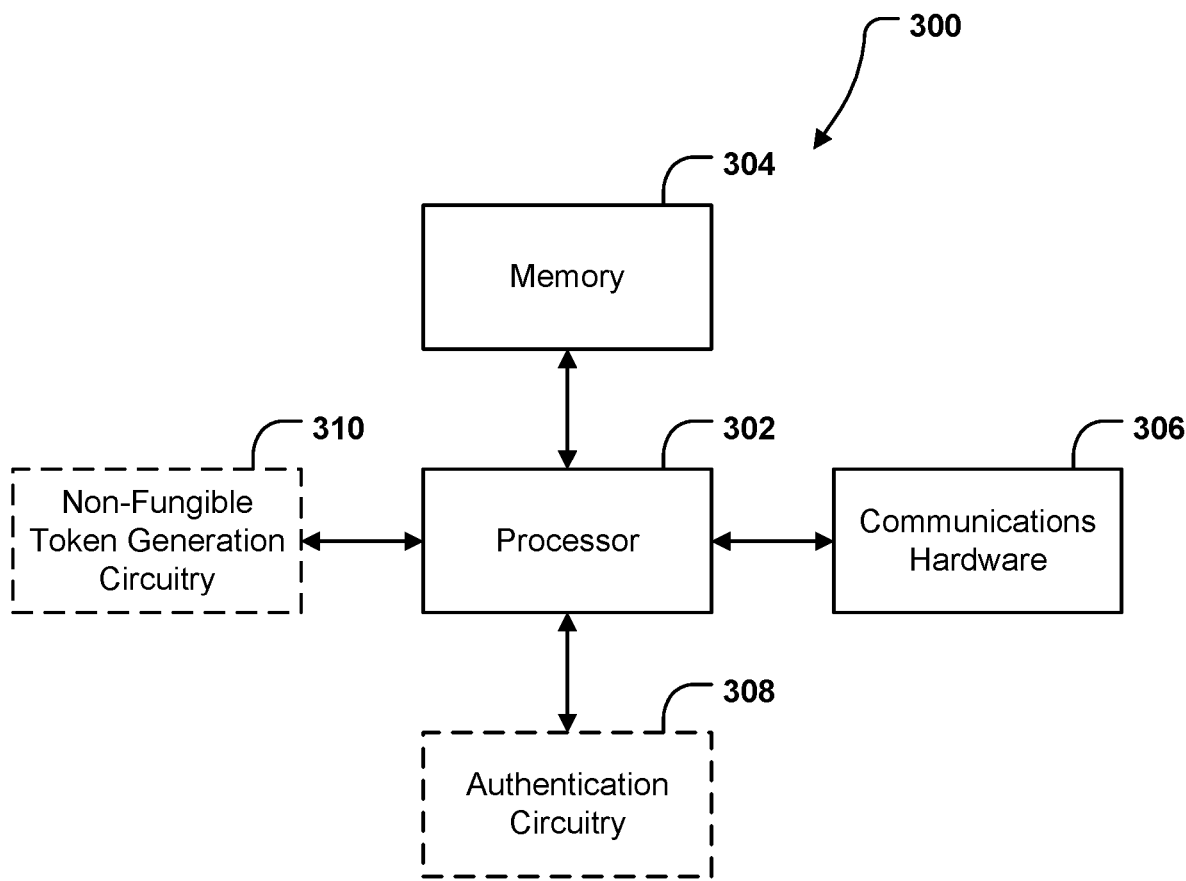
FIG. 3 illustrates a schematic block diagram of example circuitry embodying a user device or network connected device that may perform various operations in accordance with some example embodiments described herein.

As illustrated in FIG. 3, an apparatus 300 is shown that represents an example network connected device of the one or more network connected devices 120A-120N or a user device of the one or more user devices 130A-130N. The apparatus 300 comprises processor 302, memory 304, communications hardware 306, and optionally, authentication circuitry 308 and non-fungible token generation circuitry 310, each of which is configured to be similar to the similarly named components described above in connection with FIG. 2.

Although components of FIGS. 2-3 are described in part using functional language, it will be understood that the particular implementations necessarily include the use of particular hardware. It should also be understood that certain of these components may include similar or common hardware. For example, the authentication circuitry 208 and non-fungible token generation circuitry 210 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although authentication circuitry 208, and non-fungible token generation circuitry 210 may leverage processor 202, memory 204, or communications hardware 206, as described above, it will be understood that any of these elements of apparatus 200 or similarly named elements of apparatus 300 may include one or more dedicated processor, specially configured field programmable gate array (FPGA), or application specific interface circuit (ASIC) to perform its corresponding functions, and may accordingly leverage processor 202 executing software stored in a memory (e.g., memory 204), memory 204, or communications hardware 206 (or similarly named elements of apparatus 300) for enabling any functions not performed by special-purpose hardware elements. In all embodiments, however, it will be understood that the authentication circuitry and non-fungible token generation circuitry are implemented via particular machinery designed for performing the functions described herein in connection with such elements of apparatus 200 or apparatus 300.

In some embodiments, various components of the apparatus 200 and apparatus 300 may be hosted remotely (e.g., by one or more cloud servers) and thus need not physically reside on the corresponding apparatus 200 or apparatus 300. Thus, some or all of the functionality described herein may be provided by third party circuitry. For example, a given apparatus 200 or apparatus 300 may access one or more third party circuitries via any sort of networked connection that facilitates transmission of data and electronic information between the apparatus 200 or apparatus 300 and the third party circuitries. In turn, that apparatus 200 or apparatus 300 may be in remote communication with one or more of the other components described above as comprising the apparatus 200 or apparatus 300.

As will be appreciated based on this disclosure, example embodiments contemplated herein may be implemented by an apparatus 200 or apparatus 300. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2 or apparatus 300 as described in FIG. 3, that loading the software instructions onto a computing device or apparatus produces a special-purpose machine comprising the means for implementing various functions described herein.

Having described specific components of example apparatus 200 and example apparatus 200, example embodiments are described below in connection with a series of diagrams and flowcharts.

Example Verification System Operations

Figure 4:
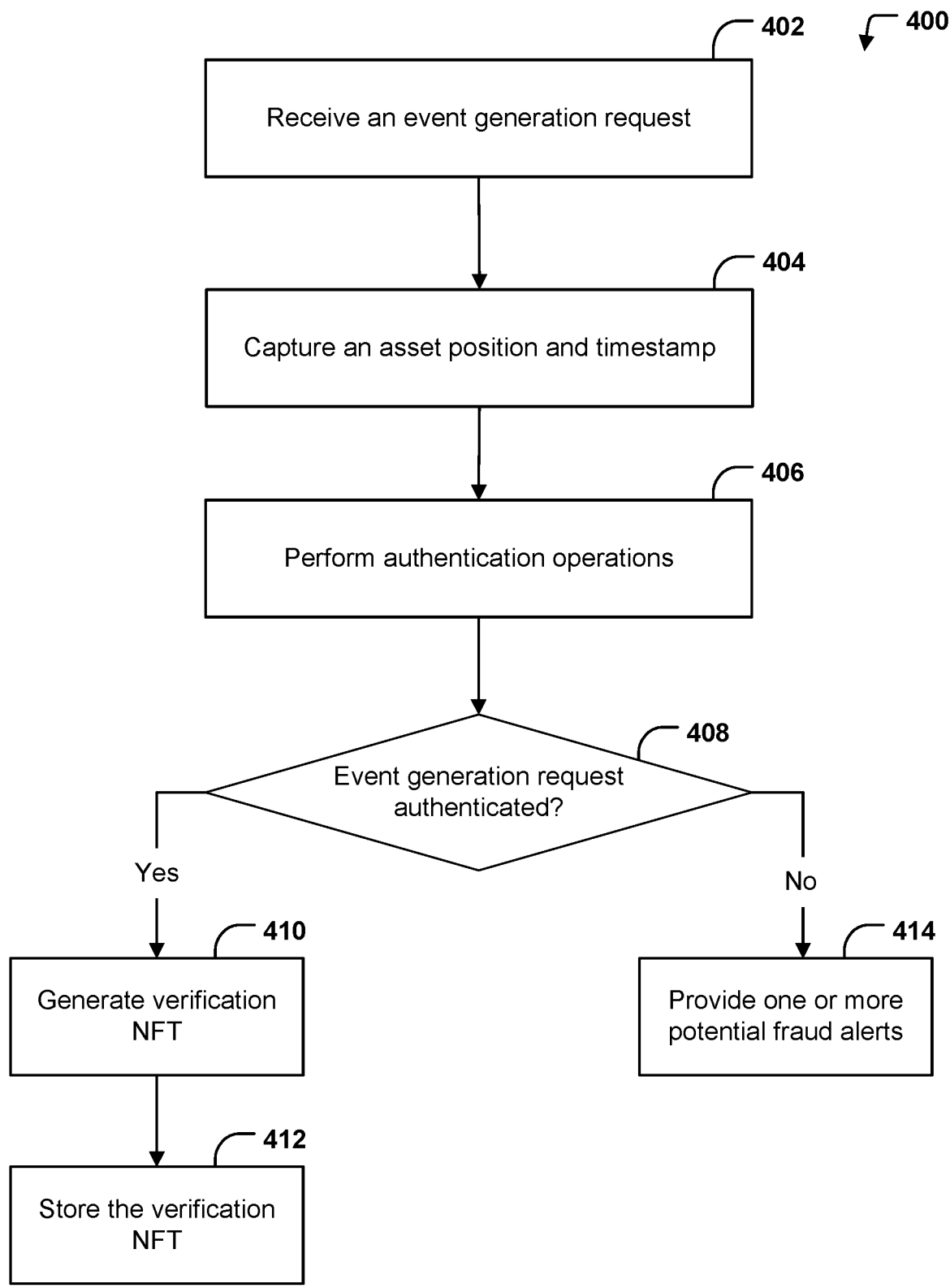
FIG. 4 illustrates an example flowchart for generating a verification non-fungible token, in accordance with some example embodiments described herein.

Turning to FIG. 4, example flowcharts are illustrated that contain example operations implemented by example embodiments described herein. The operations illustrated in FIG. 4 may, for example, be performed by system device 104 of the verification system 102 shown in FIG. 1, which may in turn be embodied by an apparatus 200, which is in turn described in connection with FIG. 2. To perform the operations described below, the apparatus 200 may utilize one or more of processor 202, memory 204, communications hardware 206, authentication circuitry 208, non-fungible token generation circuitry 210, and/or any combination thereof. In particular, FIG. 4 depicts example operations 400 for generating a verification NFT.

As shown by operation 402, the apparatus 200 includes means such as processor 202, memory 204, communications hardware 206, and/or the like for receiving an event generation request. An event generation request may be configured to indicate a request for the generation of a verification NFT for a particular user.

The event generation request may include an asset identifier and one or more authentication credentials. In some embodiments, the event generation request may further include an indication of a device identifier corresponding to the device (e.g., a user device 130A or network connected device 120A) which generated the event generation request. In some embodiments, the event generation request may further include device coordinates corresponding to the device (e.g., user device or network connected device) which generated the event generation request. In some embodiments, the event generation request may further include a generation timestamp, indicative of when the date and time at the event generation request was generated by the user device 130A or network connected device 120A or received by apparatus 200.

At operation 404, the apparatus 200 includes means such as processor 202, memory 204, non-fungible token generation circuitry 210, and/or the like for capturing an asset position and timestamp. In some embodiments, the non-fungible token generation circuitry 210 may be configured to automatically capture an asset position and timestamp in response to receiving the event generation request. The captured timestamp may be the generation timestamp, indicative of when the date and time at the event generation request was generated by the user device or network connected device. In some embodiments, the asset position may be determined based on whether the event generation request was received from a network connected device. The network connected device may be a computing device associated with a known physical location within a facility. For example, a network connected device may be a badge-in terminal, a Bluetooth terminal, or other computing device associated with the facility.

Figure 5:
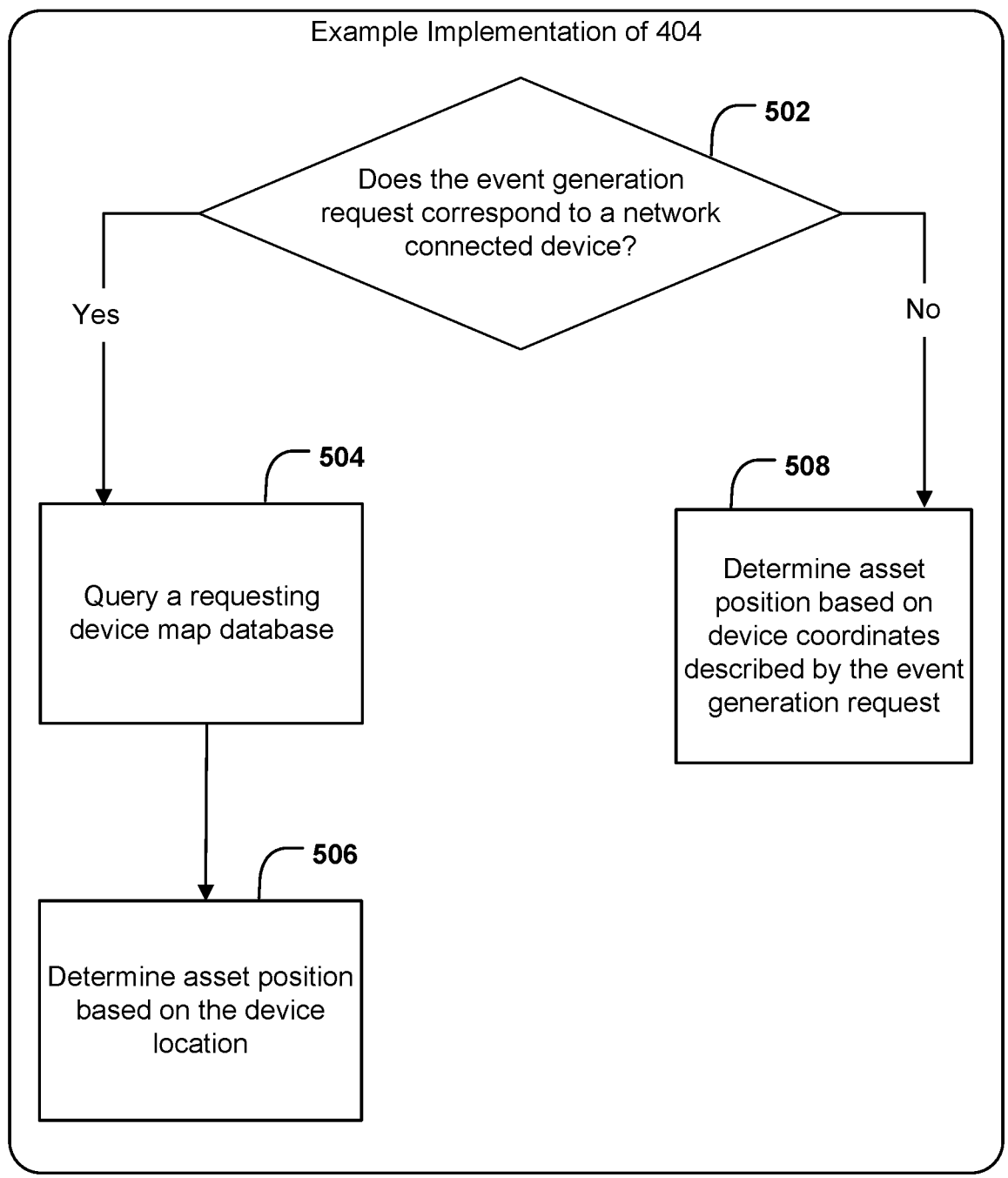
FIG. 5 illustrates an example flowchart for determining a user position, in accordance with some example embodiments described herein.

In some embodiments, operation 404 may be performed in accordance with the various operations of the process that is depicted in FIG. 5. FIG. 5 is a flowchart diagram of an example process for capturing an asset position.

At operation 502, the apparatus 200 includes means such as processor 202, memory 204, non-fungible token generation circuitry 210, and/or the like for determining whether the event generation request corresponds to a network connected device. As described above, the network connected device may be a computing device that is associated with a known physical location within a facility. The event generation request may include a device identifier which may uniquely identify the device. The device identifier may be a combination of alphanumeric characters which is assigned to a device and uniquely identifies the device. In some embodiments, the device identifier may be an ICCID, UDID, and/or the like. The non-fungible token generation circuitry 210 may be configured to query a stored set of network connected devices to determine if the device identifier described by the event generation request matches a network device identifier in the set of network connected devices. If the non-fungible token generation circuitry 210 determines a device identifier match, the non-fungible token generation circuitry 210 may determine the event generation request corresponds to a network connected device.

In some embodiments, a network connected device 120A may be the device which generated the event generation request. In some embodiments, the network connected device 120A may be a device which acted as an intermediary between a user device 130A and apparatus 200 to relay the user device generated event generation request to apparatus 200.

In an instance the event generation request corresponds to a network connected device, the process proceeds to operation 504. At operation 504, the apparatus 200 includes means such as processor 202, memory 204, non-fungible token generation circuitry 210, and/or the like for querying a requesting device map database. A requesting device map database may be a database associated with the apparatus 200, which is configured to identify network-connected device locations based on a respective device identifier. The non-fungible token generation circuitry 210 may query the requesting device map database using the device identifier provided by the event generation request. The query may return a device location for a network connected device which corresponds to the device identifier. The location of the network-connected device may correspond to a physical location where the network-connected device is installed. The location of the network connected device may be within a facility and may further correspond to a room, portion of a room, floor level, or other facility location description. For example, the location of the network connected device may be "Building A, floor 2, office 123" indicating the network connected device is located in Building A on the $2^{nd}$ floor in the office 123. In some embodiments, the location of the network connected device may further be associated with a range. For example, the network connected device may be a Bluetooth terminal, which may receive Bluetooth signals from devices within 30 feet of its location. As such, location of the network connected device may have an associated range of 30 feet.

At operation 506, the apparatus 200 includes means such as processor 202, memory 204, non-fungible token generation circuitry 210, and/or the like for determining the asset position based on a device location. Once the non-fungible token generation circuitry 210 determines the device location by querying the device map database as described in operation 504, the non-fungible token generation circuitry 210 may determine the asset position based on the device location. In some embodiments, the asset position may be determined to be the same as the device location. In some embodiments, the asset position may further include one or more modifiers, indicating a proximity to the network connected device. By way of continuing example, the one or more modifiers for an asset position for a user who interacted with the Bluetooth terminal which generated the event generation request may be "within 30 feet". As such, the asset location may be determined to be "within 30 feet of office 123 on floor 2 of Building A". Advantageously, the use of a network-connected device may provide for a 3-dimensional representation of a user position by providing an indication of altitude, height, or the like.

In an instance the event generation request does not correspond to a network connected device, the process proceeds to operation 508. At operation 504, the apparatus 200 includes means such as processor 202, memory 204, non-fungible token generation circuitry 210, and/or the like for determining the asset position based on device coordinates described by the event generation request. In an instance the event generation request does not correspond to a network connected device (e.g., the event generation request was generated and provided to the apparatus 200 by the user device 130A). The event generation request may include device coordinates, which may correspond to coordinates of the computing device which generated the event generation request. In some embodiments, the device coordinates may be global positioning system (GPS) coordinates, relative coordinates (e.g., relative to a point of reference within a facility), and/or the like.

Returning now to FIG. 4, at operation 406, the apparatus 200 includes means such as processor 202, memory 204, authentication circuitry 208, and/or the like for performing one or more authentication operations. The one or more authentication operations may be performed on the event generation request in an attempt to verify the identity of the asset associated with the event generation request and requesting a verification NFT. The one or more authentication operations may authenticate an event generation request based on the asset identifier and the one or more authentication credentials.

Figure 6:
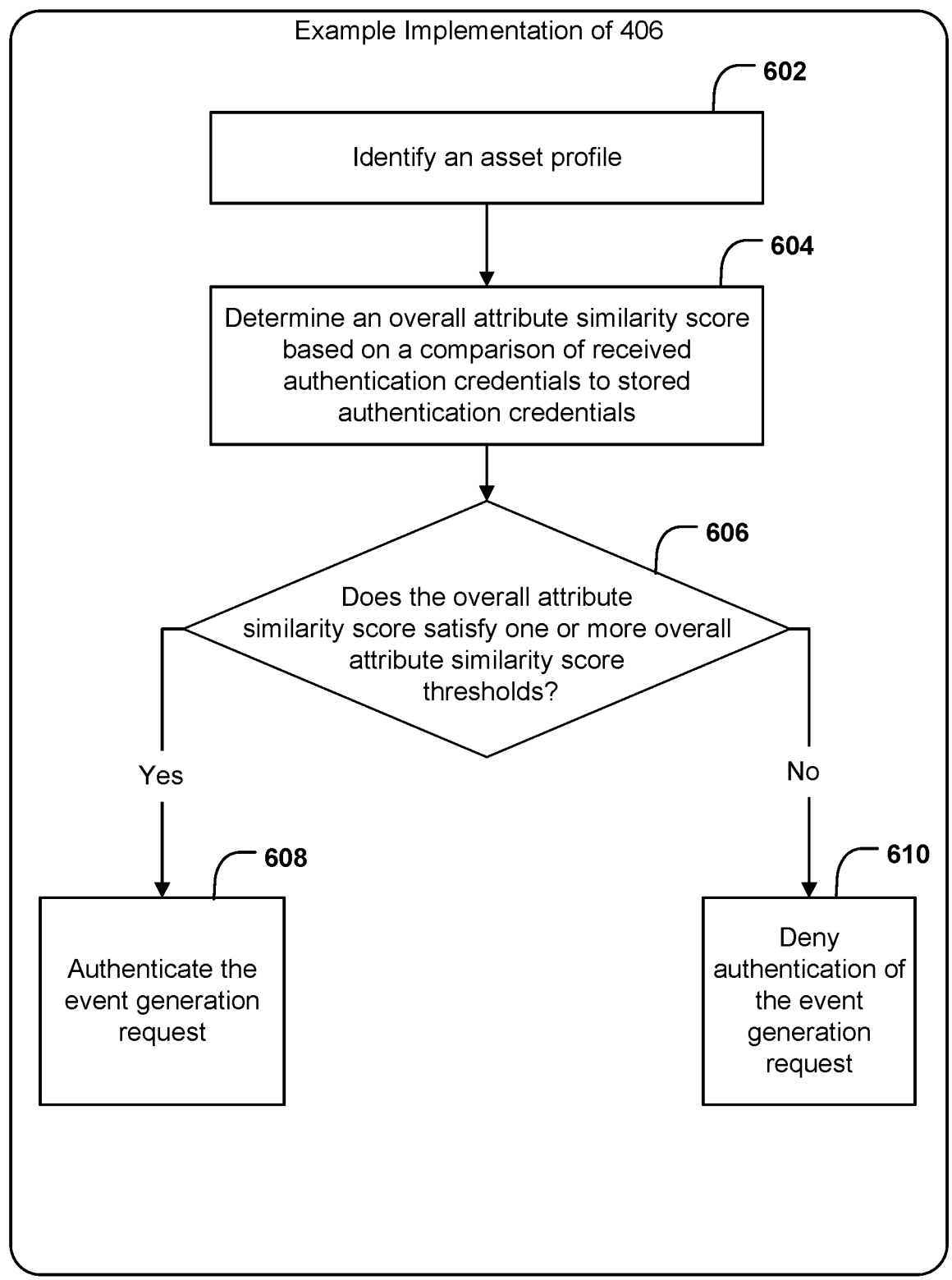
FIG. 6 illustrates an example flowchart for performing the one or more authentication operations, in accordance with some example embodiments described herein.

In some embodiments, operation 406 may be performed in accordance with the various operations of the process that is depicted in FIG. 6. FIG. 6 is a flowchart diagram of an example process for performing the one or more authentication operations.

At operation 602, the apparatus 200 includes means such as processor 202, memory 204, authentication circuitry 208, and/or the like for identifying an asset profile. The authentication circuitry 208 may use the asset identifier to identify the asset profile, which may correspond to an asset. An asset profile may store information and/or data related to the asset, including sensitive information. For example, an asset profile may include one or more authentication credentials such as one or more passwords, biometric data (e.g., fingerprint, voice print, retina scan, face scan, etc.), device pattern data (e.g., swipe patterns, keyboard stroke patterns, etc.), or other asset identifying information. The asset profile may also include other asset data include a reference asset image, an asset authentication history, a verification NFT history, a travel NFT history, and/or the like.

In some embodiments, at least a portion of the information stored in the asset profile may be encrypted using one or more encryption techniques and/or tokenized using one or more tokenization techniques such that the information is protected. The information (e.g., one or more authentication credentials) may be encrypted using any suitable encryption algorithm such as symmetric encryption techniques (e.g., advanced encrypted standard (AES), data encryption standard (DES), Blowfish, etc.), asymmetric encryption techniques (e.g., Diffie-Hellman, Rivest-Shamir-Adleman (RSA), etc.), or hash-based functions (e.g., MD5 message-digest algorithm, secure hash algorithm (SHA), etc.). In some embodiments, at least a portion of the information is stored in hashed form. A hash function may be used to generate the hashed information. The hash function may be a one-way function configured to generate hashed values. In some embodiments, the hash function may also use a salt value to when generating the hashed information. As such, sensitive information (e.g., authentication credentials) may be stored in a protected manner and still serve to authenticate a user.

At operation 604, the apparatus 200 includes means such as processor 202, memory 204, authentication circuitry 208, and/or the like for determining an overall attribute similarity score. In some embodiments, the authentication circuitry 208 may determine the overall attribute similarity score based on a comparison of one or more of the one or more authentication credentials described by the event generation request and one or more stored authentication credentials associated with the asset profile.

In some embodiments, the authentication circuitry 208 may be configured to decrypt one or more authentication credentials stored in the asset profile using an associated cryptographic key, which was used to encrypt the one or more authentication credentials. In some embodiments, the one or more authentication credentials is encrypted using a public key of an asymmetric cryptographic key pair and authentication circuitry 208 may be configured to decrypt the one or more authentication credentials using a corresponding private key of the asymmetric cryptographic key pair. The authentication circuitry 208 may only decrypt authentication credentials which correspond to the same authentication credential type of a received authentication credential.

In some embodiments, the authentication circuitry 208 may be configured to provide the one or more authentication credentials described by the event generation request to a hash function to generate a hashed received authentication credential. The hashed received authentication credential may then be compared to a stored hashed authentication credential.

In some embodiments, the authentication circuitry 208 may determine the overall attribute similarity score using an attribute similarity machine learning model, which may be part on an ensemble machine learning framework. The ensemble machine learning framework may include a pre-processing layer, one or more per-attribute similarity machine learning models, and an attribute similarity machine learning model.

Figure 17:
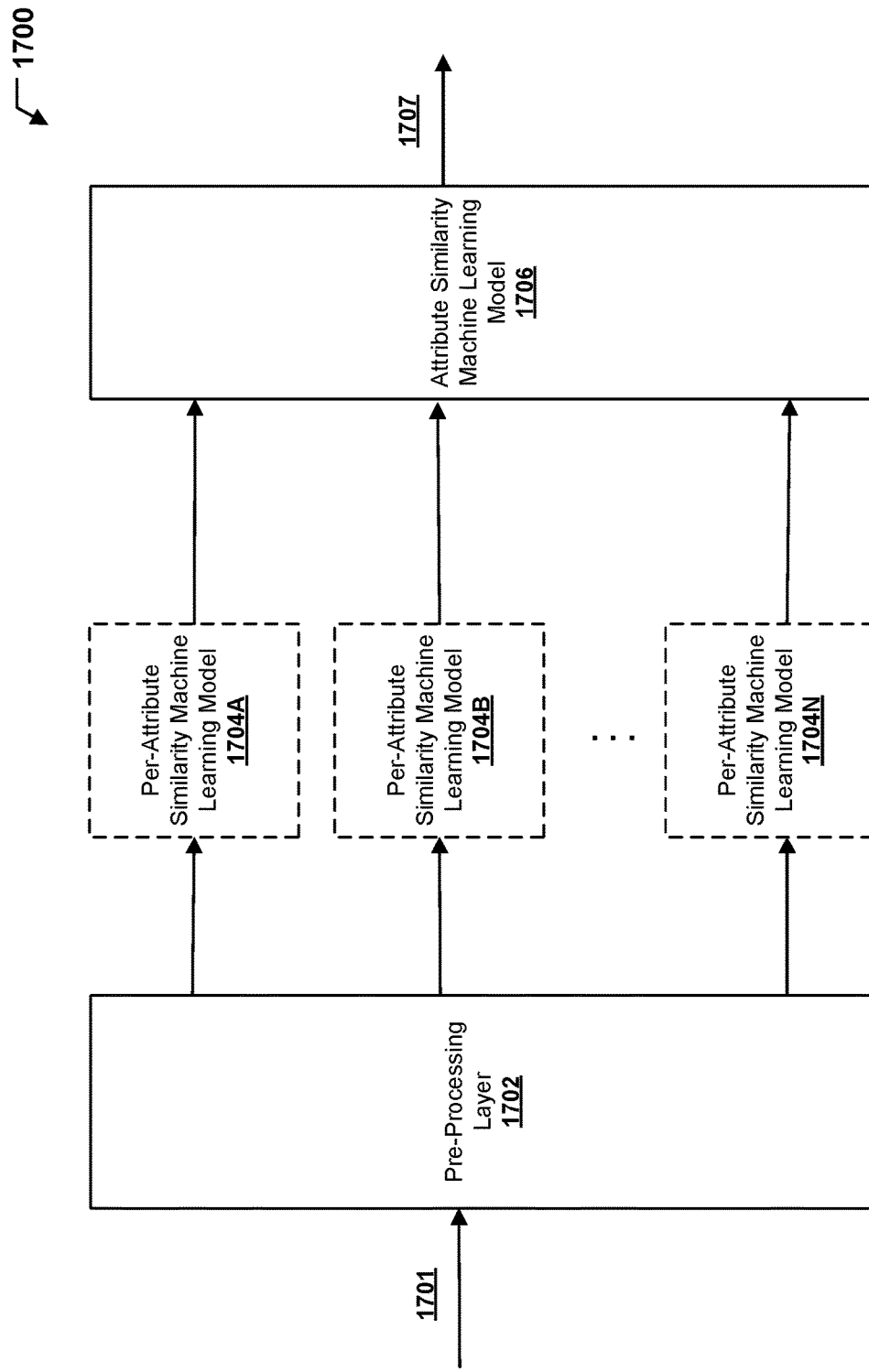
FIG. 17 provides an example ensemble machine learning framework which may be used to determine an overall authentication score for an event generation request, in accordance with some example embodiments described herein.

FIG. 17 provides an example ensemble machine learning framework 1700 which may be used to determine an overall authentication score for an event generation request. The ensemble machine learning framework 1700 may receive the event generation request at operation 1701. In some embodiments, the ensemble machine learning framework 1700 may include a pre-processing layer 1702, which may be configured to extract the one or more authentication credentials from the event generation request. The pre-processing layer 1702 may also be configured to identify an authentication credential type from a candidate list of authentication credential types for each extracted authentication credential. In some embodiments, the pre-processing layer may further be configured to extract the asset identifier from the event generation request.

In some embodiments, the pre-processing layer 1702 may be configured to provide each extracted authentication credential to a per-attribute similarity machine learning model. The pre-processing layer 1702 may determine the per-attribute similarity machine learning model 1704A-1704N to provide the extracted authentication credential to based on the authentication credential type. Each per-attribute similarity machine learning model 1704A-1704N may be trained to process a particular authentication credential type to generate a per-attribute similarity score for the particular authentication credential. Each per-attribute similarity machine learning model may be a trained neural network, such as a convolution neural network (CNN).

In some embodiments, a per-attribute similarity score may be a binary value (e.g., 0 or 1) and may be indicative of whether the particular authentication credential is authenticated. In some embodiments, a per-attribute similarity score may be a numerical value (e.g., number, percentage, etc.) and may be indicative of how closely the particular authentication credential matched a stored authentication credential. The per-attribute similarity score for an authentication credential may be determined by comparing the authentication credential extracted from the event generation request data object to a corresponding authentication credential stored in the asset profile in the appropriate form (e.g., hashed, decrypted, etc.). For example, a per-attribute similarity machine learning model 1704A may be associated with a password authentication credential type such that the per-attribute similarity machine learning model 1704A is trained and configured to process a password from the event generation request. Each character of the received password from the event generation request and the password stored in the asset profile may be compared and the per-attribute similarity score may be determined to be "1" if the received password and stored password exactly match or "0" otherwise. As another example, a per-attribute similarity machine learning model 1704B may be associated with a biometric fingerprint authentication credential type such that the per-attribute similarity machine learning model 1704B is trained and configured to process a biometric fingerprint from the event generation request. The per-attribute similarity machine learning model 1704B may be trained to identify one or more features from a biometric fingerprint (e.g., locations of ridges, whorls, loops, etc.) such as by using one or more algorithms such as Gaussian mixture models (GMMs), artificial neural networks (ANNs), fuzzy expert systems (FES s), support vector machine (SVMs), and/or the like to generate a candidate biometric template. The per-attribute similarity machine learning model 1704B may then be configured to determine a similarity between the candidate biometric template and a stored biometric template which corresponds to a user fingerprint authentication credential to generate a per-attribute similarity score. The per-attribute similarity score may be a decimal value between 0 and 1 which may indicate the similarity between the received or determined biometric template and the stored biometric template, where "0" may be indicative of no similarity between the biometric templates and "1" may indicative of exactly matching biometric templates. Alternatively, the biometric fingerprint may already be in biometric template form (as generated by a user device or network connected device).

The per-attribute similarity score may be provided to an attribute similarity machine learning model 1706. The attribute similarity machine learning model 1706 may be configured to receive each per-attribute similarity score from the per-attribute similarity machine learning models 1704A-1704B. The attribute similarity machine learning model may be a trained neural network, such as a convolution neural network (CNN).

The attribute similarity machine learning model 1706 may receive one or more per-attribute similarity scores from one or more per-attribute similarity machine learning models 1704A-1704N and generate the overall attribute similarity score for the event generation request based on the one or more per-attribute similarity scores. In particular, the attribute similarity machine learning model may aggregate each per-attribute similarity score, such as by determining a weighted average, and in some embodiments, use an accuracy indication measure to determine the overall attribute similarity score. Each per-attribute similarity score may be weighted according to an associated confidence score. The confidence score may be determined based on the associated per-attribute similarity machine learning model which generated the per-attribute similarity score. The confidence score may be indicative of the value of confidence placed in a particular authentication credential for accurately identifying an asset. For example, a password authentication credential type may be associated with a lower confidence score than a fingerprint biometric authentication credential type. The accuracy indication measure may be determined based on the number of authentication credentials which are provided by the event generation request. For example, the accuracy indication type may be assigned a numeric value which corresponds to the count of authentication credentials provided by the event generation request. In some embodiments, the overall attribute similarity score may output an authentication status 1707, which may be a binary value (e.g., 0 or 1) and may be indicative of whether the event generation request is authenticated. A value of "0" may correspond to a failed authentication status for the event generation request while a value of "1" may correspond to an authenticated status for the event generation request. Alternatively, the overall attribute similarity score may a numeric or percentage value which is representative of a similarity between each authentication credential provided in the event generation request and the corresponding stored authentication credential.

Alternatively, the attribute similarity machine learning model 1706 may be configured to generate the overall attribute similarity score by processing the one or more authentication credentials without the use of the per-attribute similarity machine learning models.

Returning to FIG. 6, at operation 606, the apparatus 200 includes means such as processor 202, memory 204, authentication circuitry 208, and/or the like for determining whether the overall attribute similarity score satisfies one or more overall attribute similarity score thresholds. Once the authentication circuitry 208 determines the overall attribute similarity score, the authentication circuitry 208 may determine whether the overall attribute similarity score satisfies one or more similarity score thresholds. For example, an overall similarity score threshold may be "1" such that a binary overall similarity score of "1" satisfies the one or more overall similarity score thresholds and a binary overall similarity score of "0" does not satisfy the one or more overall similarity score thresholds. As another example, an overall similarity score threshold may be "0.75" such that an overall similarity score of "0.75" or above satisfies the one or more overall similarity score thresholds and an overall similarity score below "0.75" does not satisfy the one or more overall similarity score thresholds.

In an instance the overall attribute similarity score satisfies the one or more overall attribute similarity score thresholds, the process proceeds to operation 608. At operation 608, the apparatus 200 includes means such as processor 202, memory 204, authentication circuitry 208, and/or the like for authenticating the event generation request.

In an instance the overall attribute similarity score fails to satisfy the one or more overall attribute similarity score thresholds, the process proceeds to operation 610. At operation 610, the apparatus 200 includes means such as processor 202, memory 204, authentication circuitry 208, and/or the like for denying authentication of the event generation request.

Returning now to FIG. 4, at operation 408, the apparatus 200 includes means such as processor 202, memory 204, authentication circuitry 208, and/or the like for determining whether the event generation request was authenticated. As described above with reference to FIG. 6, the authentication circuitry 208 may determine whether to authenticate the event generation request.

In an instance the event generation request failed authentication, the process proceeds to operation 414. At operation 414, the apparatus 200 includes means such as processor 202, communications hardware 206, and/or the like for providing one or more potential fraud alerts. A potential fraud alert may indicate information related to the event generation request such as the associated asset identifier, the captured asset position and timestamp, a reason for authentication failure, etc. The potential fraud alert may be provided to one or more computing devices, such as one or more user devices 130A-130N and/or one or more computing devices of authority users. As such, the user may be informed that the event generation request was not authenticated and no verification NFT was generated. Additionally, one or more authority users may be informed of attempt to generate a verification NFT such that potential identity fraud may be detected, and appropriate action may be taken.

In an instance the event generation request is authenticated, the process proceeds to operation 410. At operation 410, the apparatus 200 includes means such as processor 202, non-fungible token generation circuitry 210, and/or the like for generating a verification NFT. A verification NFT may be a data structure which is associated with a particular asset identifier and may be configured to describe asset details, such as the asset location at a particular time. In some embodiments, the verification NFT may be used for proof of presence for the asset corresponding to the asset identifier. The verification NFT may be a uniquely identifiable from other verification NFTs such that it is non-fungible. The verification NFT may be associated with a particular owner, who may control the permissions, rights, distribution, etc. of the verification NFT. In some embodiments, the verification NFT is owned by a user associated with the asset identifier.

The verification NFT may have a structure which includes a header and optionally, may include a payload. The verification NFT header may be used to uniquely identify the verification NFTs from other verification NFTS. In some embodiments, the payload of the verification NFT is blank. Alternatively, the verification NFT payload may include the asset position, the asset identifier, and the timestamp associated with the event generation request. In some embodiments, the verification NFT payload may further include the one or more authentication credentials or an indication of the one or more authentication credentials. In some embodiments, the one or more authentication credentials may be encrypted using one or more encryption techniques. In some embodiments, the verification NFT payload may include an indication of whether the authentication credential was authenticated. In some embodiments, the one or more authentication credentials may be tokenized using one or more tokenization techniques FIG. 15 depicts an operational example of a verification NFT 1500. As depicted in FIG. 15, the verification NFT 1500 may just include a header 1502, which may indicate the associated asset identifier (e.g., JohnDoe123), captured times tamp (e.g., 07-11-2022 at 14:00:00 eastern standard time (EST)), and a captured asset location (e.g., in Office 123 on floor 2 of Building A).

Returning now to FIG. 4, at operation 412, the apparatus 200 includes means such as processor 202, memory 204, communications hardware 206, and/or the like for storing the verification NFT. The verification NFT may be stored in a distributed ledger, such as on a blockchain. The distributed ledger may be a database which is consensually shared and synchronized across multiple sites, institutions, or geographies. The distributed ledger may be maintained using a peer-to-peer (P2P) computer network and consensus algorithms to allow the ledger to be replicated across distributed computer nodes. In some embodiments, the distributed ledger is a blockchain. The distributed ledger may use a proof of work (PoW) consensus or proof of stake consensus (PoS). The distributed ledger may be public or private. The computer network which maintains the distributed ledger may include one or more of user device 130A-130N, one or more network-connected device 120A-120N, and/or apparatus 200 as nodes configured to store ledger data. The distributed ledger may be a public ledger or private ledger. The verification NFT may be immutable once it is stored in the distributed ledger.

In some embodiments, the verification NFT may be stored as a block on a blockchain. One or more portions of the blockchain may be stored on a plurality of node devices. The particular devices on which the blockchain is stored may depend on whether the blockchain is public or private and the parties associated with the blockchain. In some embodiments, the verification NFT is also associated with a smart contract, which may be configured with verification NFT ownership and/or permissions data such that is able to identify, verify, and/or enforce actions related to the verification NFT (e.g., requests to access the verification NFT).

Figure 7:
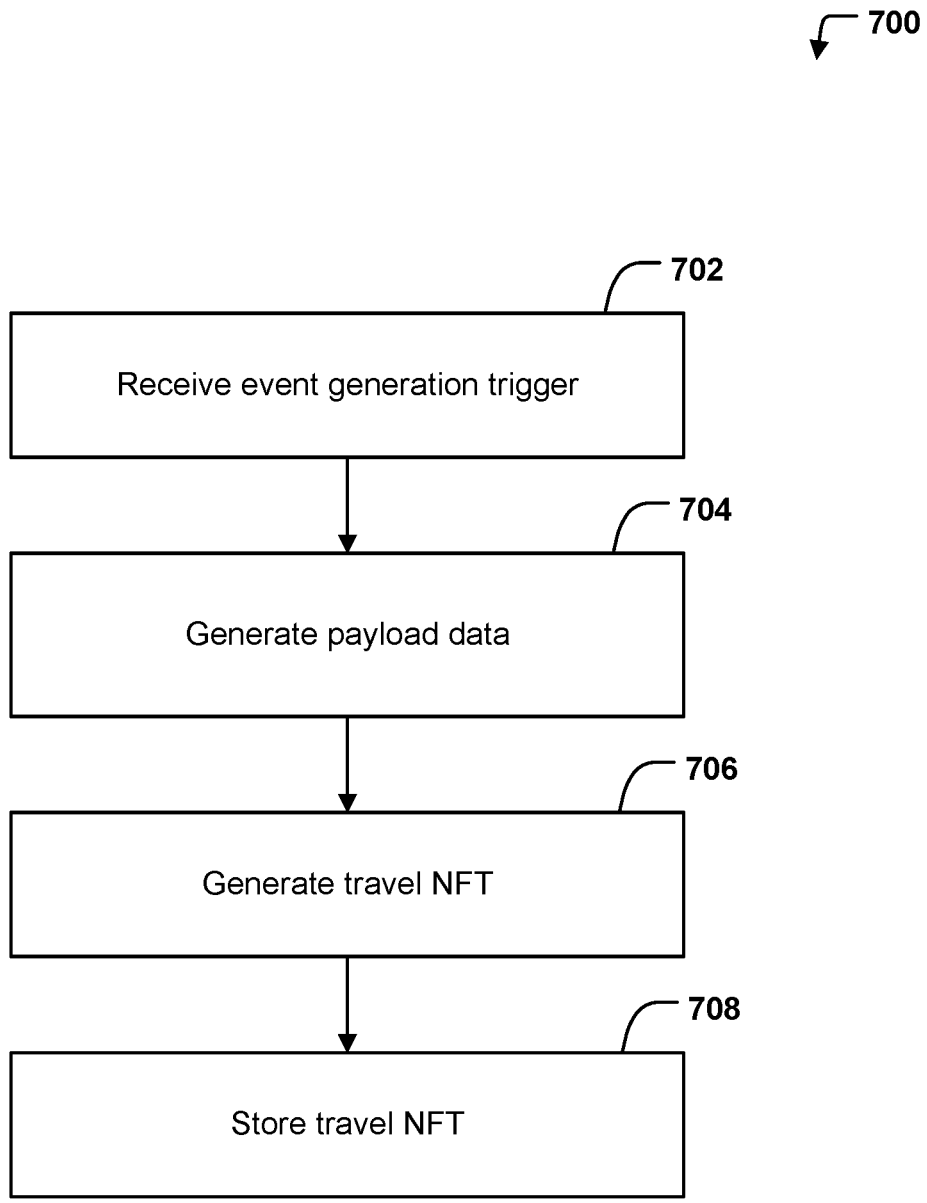
FIG. 7 illustrates an example flowchart for generating a travel non-fungible token, in accordance with some example embodiments described herein.

Turning now to FIG. 7, example operations 700 are shown for generating a travel NFT. At operation 702, the apparatus 200 includes means such as processor 202, memory 204, communications hardware 206, and/or the like for receiving an event generation trigger. An event generation trigger may be a periodically or semi-periodically generated data construct configured to cause the generation of a travel NFT for particular time window (e.g., the previous 24 hours). The event generation trigger may be automatically generated by a computing device associated with the apparatus 200 and/or by the apparatus 200 itself, such as via processor 202. A periodic trigger may be generated periodically or semi-periodically, such as every 8 hours, 24 hours, and/or the like. The event generation trigger may include an asset identifier which is indicative of the asset to generate a travel NFT for. The event generation trigger may further include a time window for which verification NFTs and/or information pertaining to the verification NFTs which are associated with the asset identifier are requested. For example, the time window may be indicative of a time range from 9:00:00 EST to 17:00:00 EST for the current day.

At operation 704, the apparatus 200 includes means such as processor 202, memory 204, non-fungible token generation circuitry 210, and/or the like for generating payload data. The non-fungible token generation circuitry 210 may generate payload data which may be incorporated into a payload of a travel NFT. In some embodiments, the non-fungible token generation circuitry 210 may generate the payload data by aggregating information from the one or more verification NFTs which correspond to the asset identifier over the time window. For example, if 3 verification NFTs are generated for a particular asset identifier, the non-fungible token generation circuitry 210 may identify each generated verification NFT and information pertaining to each verification NFT from an associated event generation request (e.g., authentication status, overall attribute similarity score, per-attribute similarity score, etc.). In some embodiments, an associated storage (e.g., memory 204) of the apparatus may be used to store event generation requests and/or metadata related to the event generation request for the particular time window such that the non-fungible token generation circuitry 210 may access the stored data to generate the payload data. Once the time window has lapsed, the apparatus 200 may be configured to clear the stored event generation requests and associated memory data from the associated storage.

In some embodiments, the generated payload data may include the asset position, the asset identifier, and the timestamp associated with each event generation request corresponding to an asset identifier over the given time window. In some embodiments, the payload data may further include the one or more authentication credentials or an indication of the one or more authentication credentials. In some embodiments, the non-fungible token generation circuitry 210 may protect at least a portion of the payload data (e.g., one or more authentication credentials) by encrypting the portion of payload using one or more encryption, tokenization, or hashing techniques as discussed above. In some embodiments, the travel NFT payload may include an indication of whether the authentication credential was authenticated.

At operation 706, the apparatus 200 includes means such as processor 202, memory 204, non-fungible token generation circuitry 210, and/or the like for generating the travel NFT. The travel NFT may be a data structure which is associated with a particular asset identifier and may be configured to describe asset details, such as the asset location over the given time window. In some embodiments, a travel NFT may be used for proof of presence for the asset corresponding to the asset identifier as well as provide a summary of asset location and/or authentication status for the given time window. The travel NFT may be a uniquely identifiable from other travel NFTs such that it is non-fungible. The travel NFT may be associated with a particular owner, who may control the permissions, rights, distribution, etc. of the travel NFT. In some embodiments, the travel NFT is owned by the user associated with the asset identifier.

The travel NFT may have a structure which includes a header and a payload. The travel NFT header may be used to uniquely identify the travel NFTs from other travel NFTS. The travel NFT payload may the payload data as described for operation 704.

FIG. 16 depicts an operational example of a travel NFT 1600. The travel NFT 1600 may include a header 1602 and a payload 1604. Although only one entry, which corresponds to a verification NFT and event generation request is shown, it will be appreciated that any number of entries may be included in the payload. As shown in FIG. 16, the payload 1604 may include an indication of the one or more authentication credentials. The one or more authentication credentials may be protected (e.g., encrypted, tokenized, hashed, etc.) and the method of protection (e.g., the particular algorithm identifier) may be stored with the authentication credential. The payload 1604 of the travel NFT 1600 may also include an indication of whether the authentication credential was authenticated 1606. The indication of whether the authentication credential was authenticated may be depicted in any suitable fashion, such as by checkmarks, colors (e.g., green text indicates authentication and red text indicates authentication failure), text (e.g., "yes", "no"), and/or the like.

At operation 708, the apparatus 200 includes means such as processor 202, memory 204, non-fungible token generation circuitry 210, and/or the like for storing the travel NFT. Once generated, the apparatus 200 may store the travel NFT in a distributed ledger, such as on a blockchain. The distributed ledger may be the same distributed ledger which is configured to store the verification NFTs. The distributed ledger may be public or private. The travel NFT may be immutable once it is stored in the distributed ledger.

In some embodiments, the travel NFT may be stored as a block on a blockchain. As described above, one or more portions of the blockchain may be stored on a plurality of node devices and the particular devices on which the blockchain is stored may depend on whether the blockchain is public or private and the parties associated with the blockchain. In some embodiments, the travel NFT is also associated with a smart contract, which may be configured with travel NFT ownership and/or permissions data such that is able to identify, verify, and/or enforce actions related to the travel NFT (e.g., requests to access the travel NFT).

Figure 8:
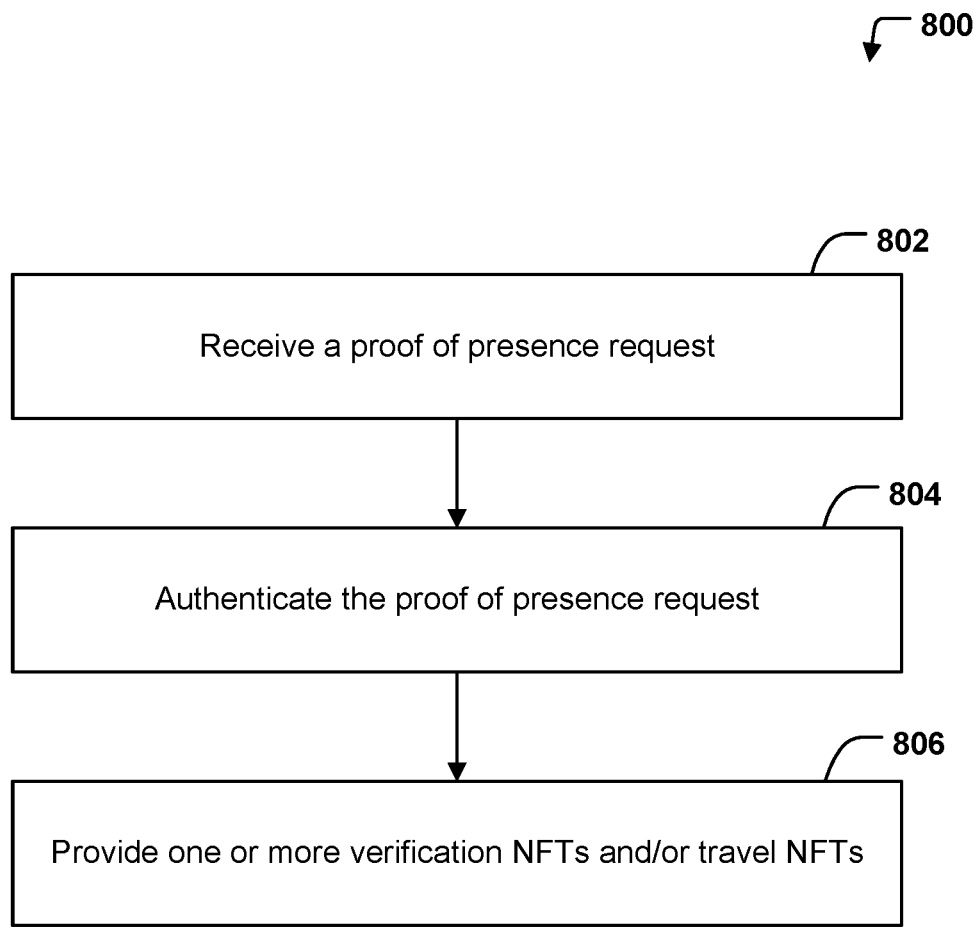
FIG. 8 illustrates an example flowchart for receiving a proof of presence request, in accordance with some example embodiments described herein.

Turning now to FIG. 8, example operations 800 are shown for receiving a proof of presence request. At operation 802, the apparatus 200 includes means such as processor 202, memory 204, communications hardware 206, and/or the like for receiving a proof of presence request. The proof of presence request may be a data structure configured to request one or more verification NFTs associated with an asset identifier for a particular time period. The proof of presence request may be received from a user device, such as one of the one or more user devices 130A-130N, or other computing device. The proof of presence request may include indication of the asset identifier and a time range. For example, the proof of presence request may indicate an asset identifier of "JohnDoe123" and a time period ranging between Jul. 11, 2022, at 14:00:00 EST to Jul. 15, 2022, at 14:00:00 EST. As such, the proof of presence request may indicate a request for all verification NFTs and/or travel NFTs within that time period which correspond to the asset identifier. In some embodiments, the proof of presence request may further indicate a type of requested NFT, such as only verification NFT, only travel NFTs, or both verification NFTs and travel NFTs.

In some embodiments, the proof of presence request may include a user identifier and one or more authentication credentials corresponding to a user requesting the proof of presence. The user identifier and one or more authentication credentials may be used to verify the identity of the requesting user and ensure the requesting user is authorized to view or otherwise access the one or more verification NFTs and/or travel NFTs.

Optionally, at operation 804, the apparatus 200 includes means such as processor 202, memory 204, authentication circuitry 208, and/or the like for authenticating the proof of presence request. In some embodiments, the authentication circuitry 208 may authenticate the whole proof of presence request or a portion of the proof of presence request. As described above, each verification NFT and travel NFT may be associated with full or partial ownership from one or more users, who may control access permissions. The authentication circuitry 208 may be configured to identify each verification NFT and/or travel NFT associated with the asset identifier and occur within the time window and determine whether the user identifier described by the proof of presence request corresponds to a user identifier which is granted access rights or permissions for each of the one or more identified verification NFTs and/or travel NFTs. In some embodiments, the authentication circuitry 208 may use the one or more smart contracts associated with the identified verification NFTs and/or travel NFTs to authenticate the proof of presence request.

The authentication circuitry may authenticate a portion of the proof of presence request for each identified verification NFT and/or travel NFT which corresponds to a user identifier which is granted access rights or permissions (e.g., the provided user identifier is determined to have been granted access rights or permissions for the verification NFT or travel NFT). The authentication circuitry may deny authentication for a portion of the proof of presence request for each identified verification NFT and/or travel NFT which does not correspond to a user identifier which is granted access rights or permissions (e.g., the provided user identifier is not determined to have been granted access rights or permissions for the verification NFT or travel NFT).

At operation 806, the apparatus 200 includes means such as processor 202, memory 204, communications hardware 206, and/or the like for providing one or more verification NFTs and/or travel NFTs. In some embodiments, the apparatus 200 may provide a link or hyperlink to the one or more verification NFTs and/or travel NFTs which were authenticated in operation 804. In some embodiments, the apparatus 200 may provide the one or more verification NFTs and/or travel NFTs in a proof of presence response, which may describe each verification NFTs and/or travel NFTs in a single message.

Example Network Connected Device or User Device Operations

Figure 9:
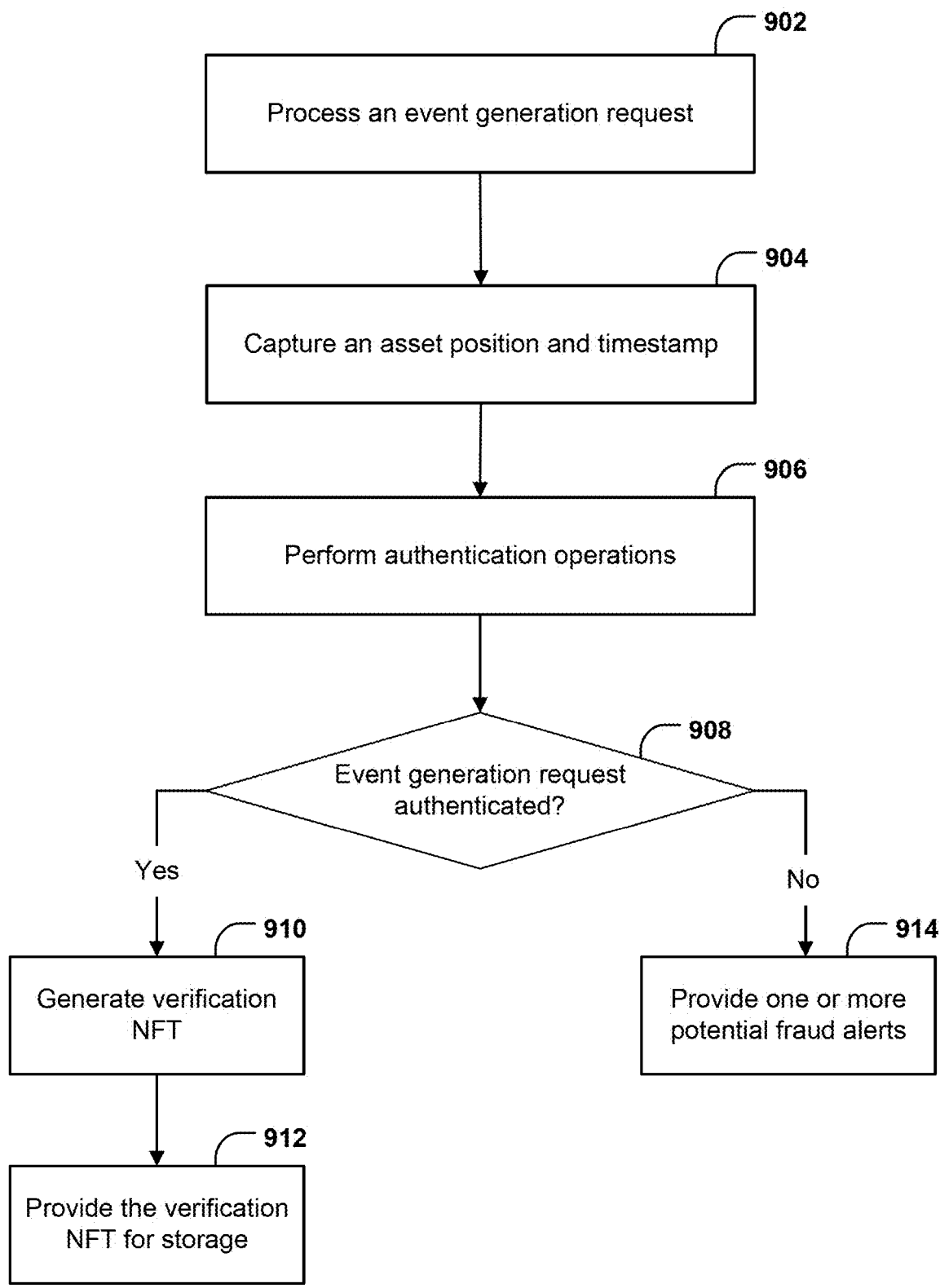
FIG. 9 illustrates an example flowchart for generating a verification non-fungible token by a user device or network connected device, in accordance with some example embodiments described herein.

Turning next to FIG. 9, example flowcharts are illustrated that contain example operations implemented by example embodiments described herein. The operations illustrated in FIG. 9 may, for example, be performed by a user device of the one or more user device 130A-130N or a network connected device 120A-120N shown in FIG. 1, which may in turn be embodied by an apparatus 300, which is in turn described in connection with FIG. 3. To perform the operations described below, the apparatus 300 may utilize one or more of processor 302, memory 304, communications hardware 306, authentication circuitry 308, non-fungible token generation circuitry 310, and/or any combination thereof.

As shown by operation 902, the apparatus 300 includes means such as processor 302, memory 304, communications hardware 306, and/or the like for processing an event generation request. An event generation request may be configured to indicate a request for the generation of a verification NFT for a particular user similarly as described above in operation 402 of FIG. 4. In some embodiments, the apparatus 300 may be configured to generate the event generation request and process the event generation request.

The apparatus 300 may be configured to automatically generate and process the event generation request in response to detection of a trigger event at the apparatus 300. For example, a user may use apparatus 300, which may be embodied as a badge-in terminal, to swipe an associated employee badge, which may indicate an asset identifier (e.g., employee identifier) and authentication credential (e.g., employee badge number) for the asset. As such the apparatus 300 may generate the event generation request once a user swipes his/her badge. The event generation request may include the captured asset identifier and one or more authentication credentials in the generated event generation request.

As another example, apparatus 300, which may be embodied as a Bluetooth terminal positioned at the entrance of a facility, may detect a signal from a user device carried by a user as the user enters within a signal range of the apparatus 300. As such the apparatus 300 may generate the event generation request once the user device is detected. The event generation request may include the captured asset identifier (e.g., a user identifier associated with the user device) and one or more authentication credentials (e.g., a user device identifier) in the generated event generation request.

As yet another example, apparatus 300, which may be embodied as computing device configured with a camera positioned within a facility, may receive a data stream from the camera and process data stream to identify one or more users using facial identification. As such the apparatus 300 may generate the event generation request once a user is detected in the data stream. The event generation request may include the captured asset identifier (e.g., a user identifier associated with the user captured by the data stream) and one or more authentication credentials (e.g., facial identification biometric data) in the generated event generation request.

Alternatively, a user may interact with the apparatus via an associated user interface to manually trigger the event generation request. As such, a user may cause event generation requests at will such that corresponding verification NFTs may be generated for the user at his/her request.

Figure 14:
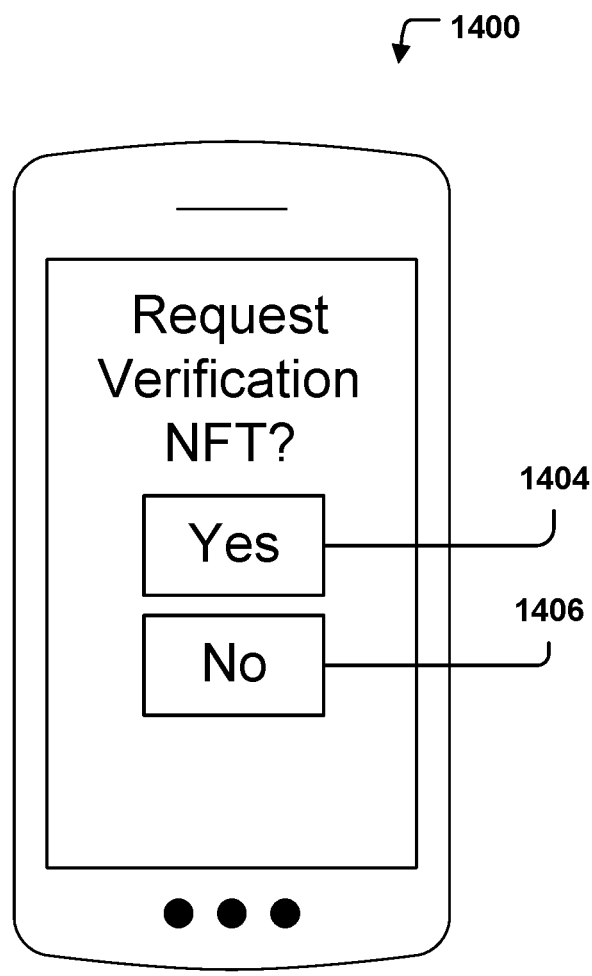
FIG. 14 provides an operational example of an event generation request user prompt, in accordance with some example embodiments described herein.

FIG. 14 depicts an operational example of an event generation request user prompt 1400. The event generation request user prompt 1400 may be initiated by a user via an associated user interface. The event generation request user prompt 1400 may be accessed by the user via an application programing interface (API) of the apparatus 300. The user may interact with the event generation request interface with a confirmation interaction input 1404 to confirm an event generation request or confirmation interaction input 1406 to cancel or abandon an event generation request. The event generation request user prompt 1400 may further be configured to prompt a user for additional user information, such as an asset identifier and one or more authentication credentials upon receipt of a confirmation interaction input 1404.

Returning now to FIG. 9, at operation 904, the apparatus 300 includes means such as processor 302, memory 304, non-fungible token generation circuitry 310, and/or the like for capturing an asset position and timestamp. The non-fungible token generation circuitry 310 may be configured to automatically capture the asset position and timestamp similarly as described above in operation 404 of FIG. 4 and operations 502-508 of FIG. 5.

In an instance the apparatus 300 is a network-connected device, such as a network connected device of the one or more network connected devices 120A-120N, the apparatus 300 may be configured to store a respective device location within an associated memory, such as memory 304. The asset position may then be determined using the stored device location.

In an instance the apparatus 300 is a user device, such as a user device of the one or more user devices 130A-130N, the apparatus 300 may be configured to determine its device coordinates. The asset position may then be determined using the device coordinates.

At operation 906, the apparatus 300 includes means such as processor 302, memory 304, authentication circuitry 308, and/or the like for performing one or more authentication operations. The one or more authentication operations may be performed on the event generation request in an attempt to verify the identity of the asset associated with the event generation request and requesting a verification NFT. The one or more authentication operations may authenticate an event generation request based on the asset identifier and the one or more authentication credentials. The authentication circuitry 308 may be configured to perform the one or more authentication operations similarly as described above in operation 406 of FIG. 4 and operations 602-610 of FIG. 6.

In some embodiments, the apparatus 300 may be automatically identify an asset profile. For example, the apparatus may store the asset profile information in an associated memory, such as memory 304. Alternatively, the apparatus 300 may request access to an asset profile for the asset identifier and thereby, cause a query to be performed.

At operation 908, the apparatus 300 includes means such as processor 302, memory 304, authentication circuitry 308, and/or the like for determining whether the event generation request was authenticated. The authentication circuitry 308 may be configured to determine whether the event generation request was authentication similarly as described above in operation 408 of FIG. 4 and operations 602-610 of FIG. 6.

In an instance the event generation request failed authentication, the process proceeds to operation 914. At operation 914, the apparatus 300 includes means such as processor 302, communications hardware 306, and/or the like for providing one or more potential fraud alerts. The apparatus 300 may be configured to provide one or more potential fraud alerts similarly as described above in operation 414 of FIG. 4.

In an instance the event generation request is authenticated, the process proceeds to operation 910. At operation 910, the apparatus 300 includes means such as processor 302, non-fungible token generation circuitry 310, and/or the like for generating a verification NFT. The non-fungible token generation circuitry 310 may be configured to generate a verification NFT similarly as described above in operation 410 of FIG. 4.

At operation 912, the apparatus 300 includes means such as processor 302, memory 304, communications hardware 306, and/or the like for providing the verification NFT for storage. In some embodiments, the apparatus 300 may provide the verification NFT to system device 104 for storage on a distributed ledger. The system device 104 may then store the verification NFT on a distributed ledger similarly as described above in operation 412 of FIG. 4.

Figure 10:
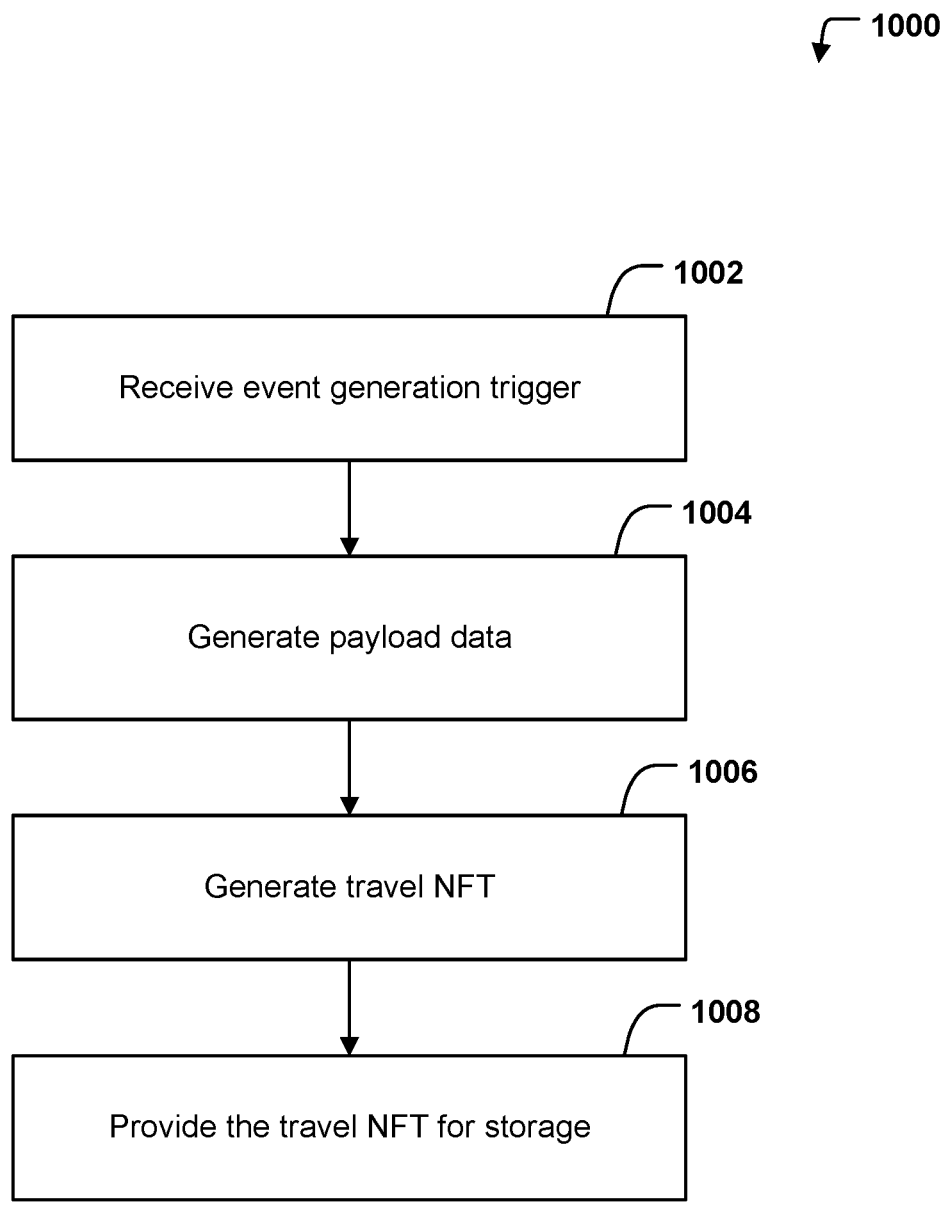
FIG. 10 illustrates an example flowchart for generating a travel non-fungible token by a user device or network connected device, in accordance with some example embodiments described herein.

Turning now to FIG. 10, example operations 1000 are shown for generating a travel NFT. At operation 1002, the apparatus 300 includes means such as processor 302, memory 304, communications hardware 306, and/or the like for receiving an event generation trigger. An event generation trigger may be a periodically or semi-periodically generated data construct configured to cause the generation of a travel NFT for particular time window (e.g., the previous 24 hours). The apparatus 300 may be configured to receive the event generation trigger similarly as described above in operation 702 of FIG. 7.

At operation 1004, the apparatus 300 includes means such as processor 302, memory 304, non-fungible token generation circuitry 310, and/or the like for generating payload data. The non-fungible token generation circuitry 310 may be configured to generate payload data similarly as described above in operation 704 of FIG. 7.

At operation 1006, the apparatus 300 includes means such as processor 302, memory 304, non-fungible token generation circuitry 310, and/or the like for generating the travel NFT. The non-fungible token generation circuitry 310 may be configured to generate the travel NFT similarly as described above in operation 706 of FIG. 7.

At operation 1008, the apparatus 300 includes means such as processor 302, memory 304, non-fungible token generation circuitry 310, and/or the like for providing the travel NFT for storage. In some embodiments, the apparatus 300 may provide the travel NFT to system device 104 for storage on a distributed ledger. The system device 104 may then store the verification NFT on a distributed ledger similarly as described above in operation 708 of FIG. 7.

Figure 11:
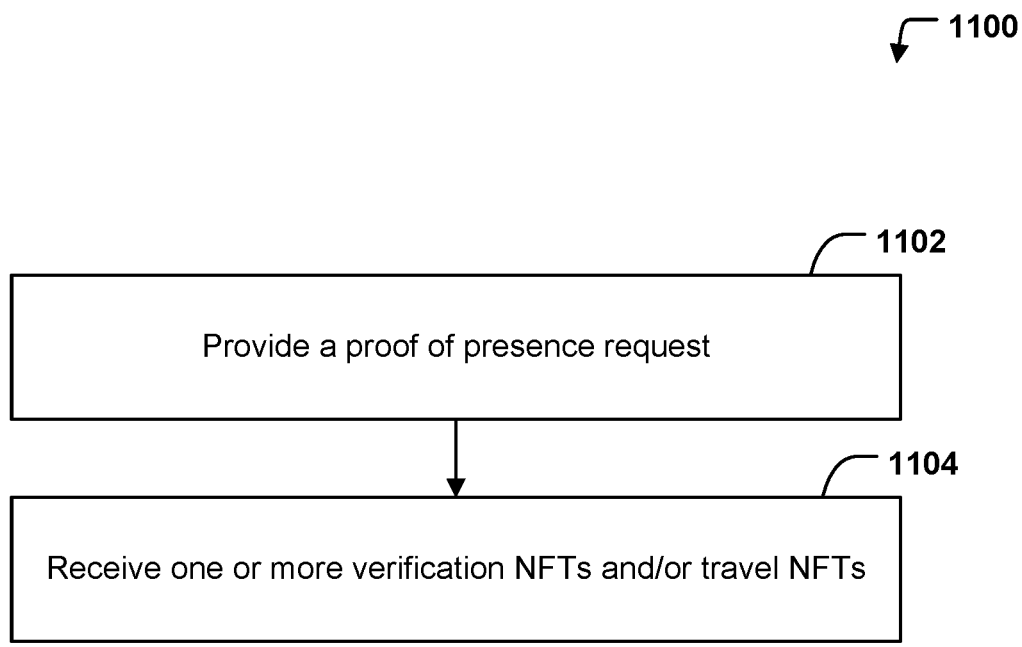
FIG. 11 illustrates an example flowchart for providing a proof of presence request, in accordance with some example embodiments described herein.

Turning now to FIG. 11, example operations 1100 are shown for providing a proof of presence request. At operation 1102, the apparatus 300 includes means such as processor 302, memory 304, communications hardware 306, and/or the like for providing a proof of presence request. The proof of presence request may be generated in response to a user request received via an associated user interface. In some embodiments, a user request may indicate an asset identifier which corresponds to an asset of interest for which the one or more verification NFTs and/or travel NFTs are requested. The user request may also indicate a time range which indicative of a range of time for which one or more verification NFTs and/or travel NFTs are requested. The user request may also indicate a type of requested NFT (e.g., only verification NFT, only travel NFTs, or both verification NFTs and travel NFTs). The proof of presence request may be provided to a system device 104.

In some embodiments, the proof of presence request may include also include an asset identifier and one or more authentication credentials corresponding to a user requesting the proof of presence. In some embodiments, the apparatus 300 may prompt a user to enter an asset identifier and/or one or more authentication credentials via a user interface. The captured asset identifier and/or one or more authentication credentials may be included in the proof of presence request and used to verify the identity of the requesting user and ensure the requesting user is authorized to view or otherwise access the one or more verification NFTs and/or travel NFTs.

At operation 1104, the apparatus 300 includes means such as processor 302, memory 304, communications hardware 306, and/or the like for receiving one or more verification NFTs and/or travel NFTs. The received one or more verification NFTs and/or travel NFTs may be received as a link or hyperlink. The apparatus 300 may allow a user to interact with the link or hyperlink to access each of the one or more received verification NFTs and/or travel NFTs. In some embodiments, the one or more verification NFTs and/or travel NFTs may be received in a proof of presence response, which may describe each verification NFTs and/or travel NFTs in a single message.

FIGS. 4-11 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Example System Operations

Figure 12A:
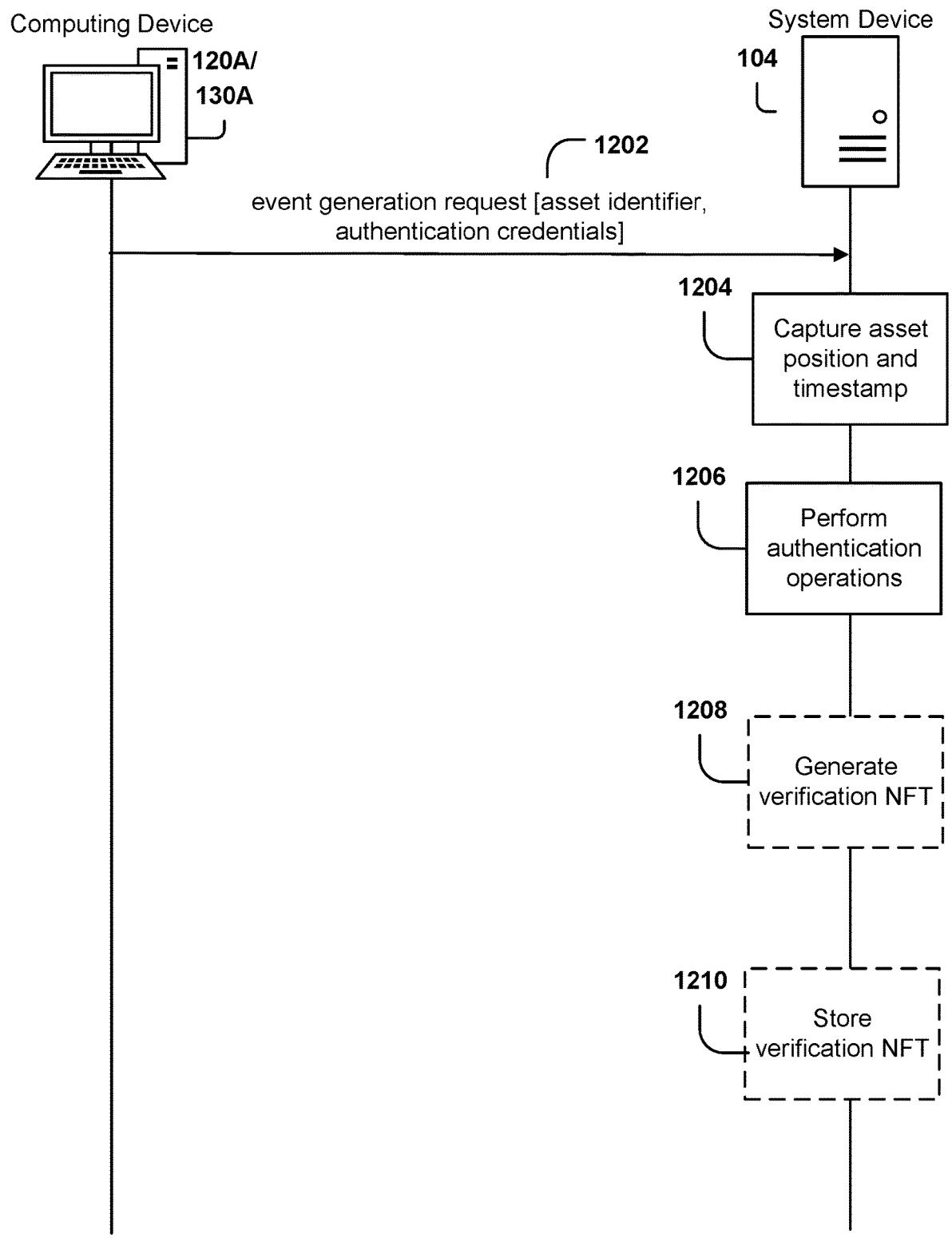
FIGS. 12A-12B illustrates a swim lane diagram of operations for generating a verification non-fungible token and/or travel non-fungible token by a system device of the verification system, in accordance with some example embodiments described herein.
Figure 12B:
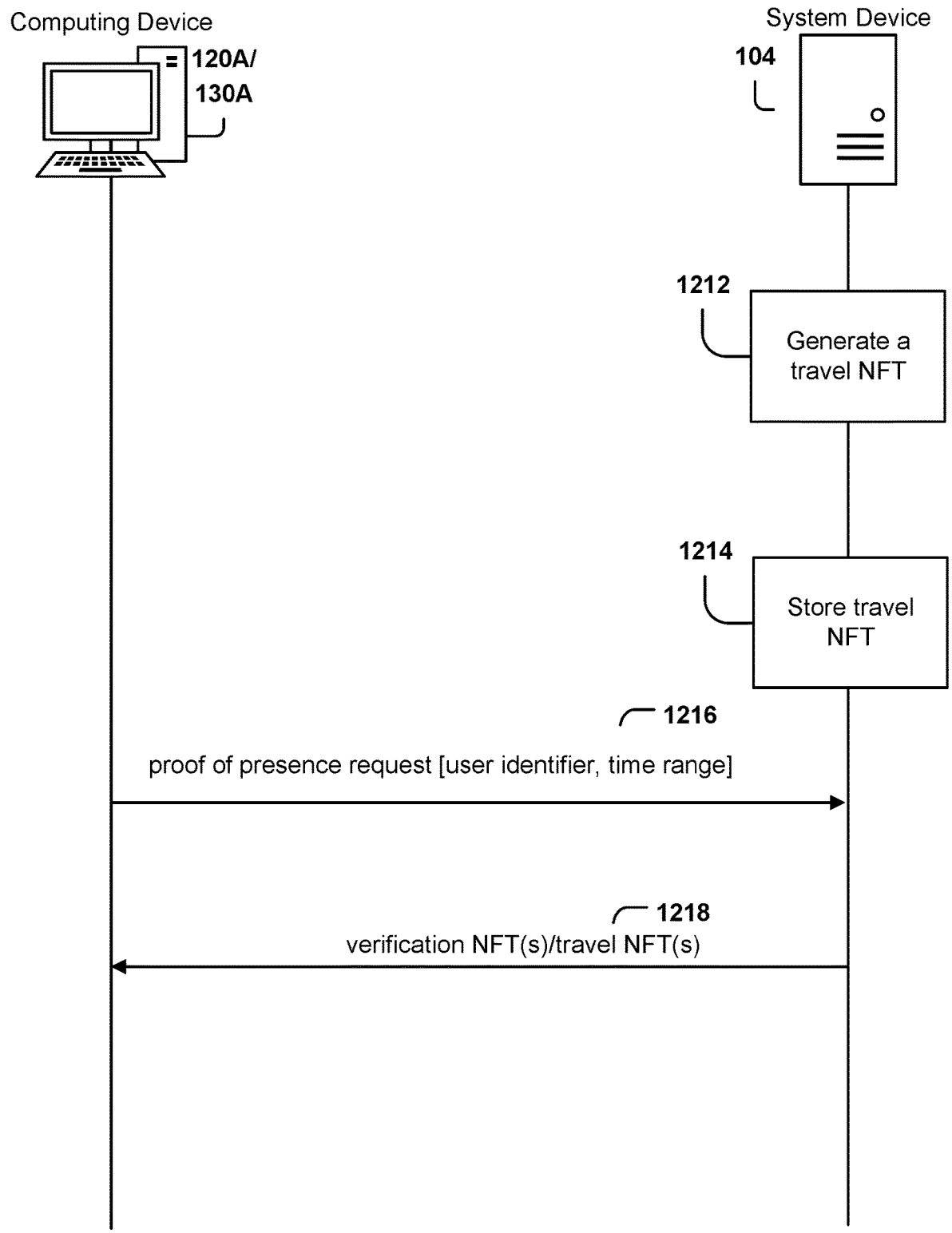

FIGS. 12A-12B show a swim lane diagram illustrating example operations (e.g., as described above in connection with FIGS. 4-8) performed by components of the environment depicted in FIG. 1 to produce various benefits from example embodiments. In these figures, operations performed by a system device 104 are shown along the vertical line extending from the element labeled "system device," operations performed by either a network connected device 120A or user device 130A are shown along the vertical line extending from the element labeled "computing device." Operations impacting both devices, such as data transmissions between the devices, are shown using arrows extending between these lines. Generally, the operations are ordered temporally with respect to one another. However, it will be appreciated that the operations may be performed in other orders from those illustrated herein.

At operation 1202, a system device 104 may receive an event generation request from either a user device 130A or network connected device 120A. The event generation request may include an asset identifier and one or more authentication credentials. At operation 1204, the system device 104 may capture the asset position and timestamp. At operation 1206, the system device 104 may perform one or more authentication operations on the event generation request. At operation 1208, the system device 104 may generate a verification NFT in an instance the event generation request is authenticated. At operation 1210, the system device 104 may store the verification NFT in a distributed ledger.

At operation 1212, the system device 104 may generate a travel NFT. The travel NFT may be generated in response to a trigger event. At operation 1214, the system device 104 may store the travel NFT in a distributed ledger. At operation 1216, the system device 104 may receive a proof of presence request from either a user device 130A or network connected device 120A. The proof of presence request may include an asset identifier and a time range. At operation 1218, the system device may provide one or more verification NFTs and/or travel NFTs to the user device 130A or network connected device 120A which provided the proof of presence request.

Figure 13A:
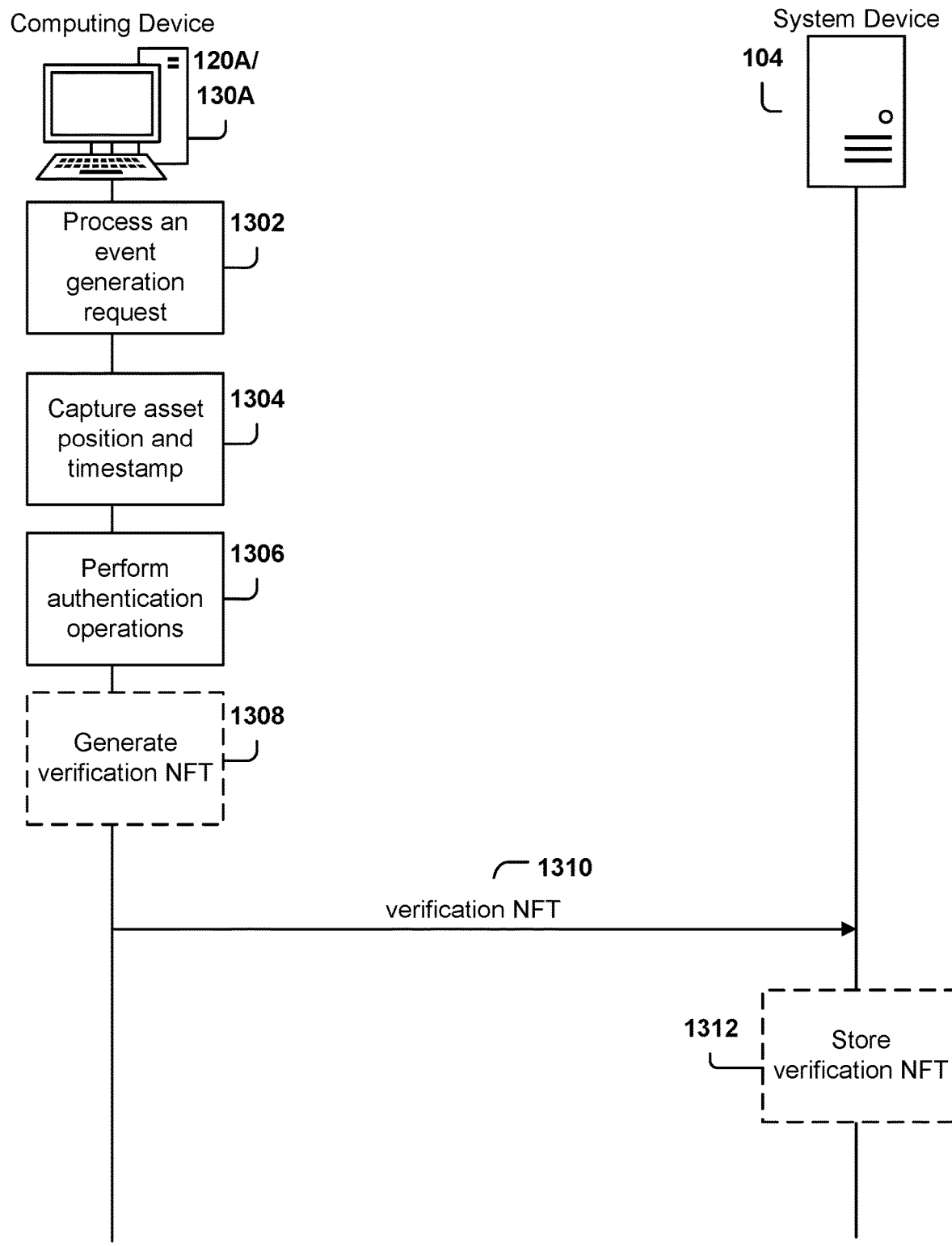
FIGS. 13A-13B illustrate a swim lane diagram of operations for generating a verification non-fungible token and/or travel non-fungible token by a user device or network connected device, in accordance with some example embodiments described herein.
Figure 13B:
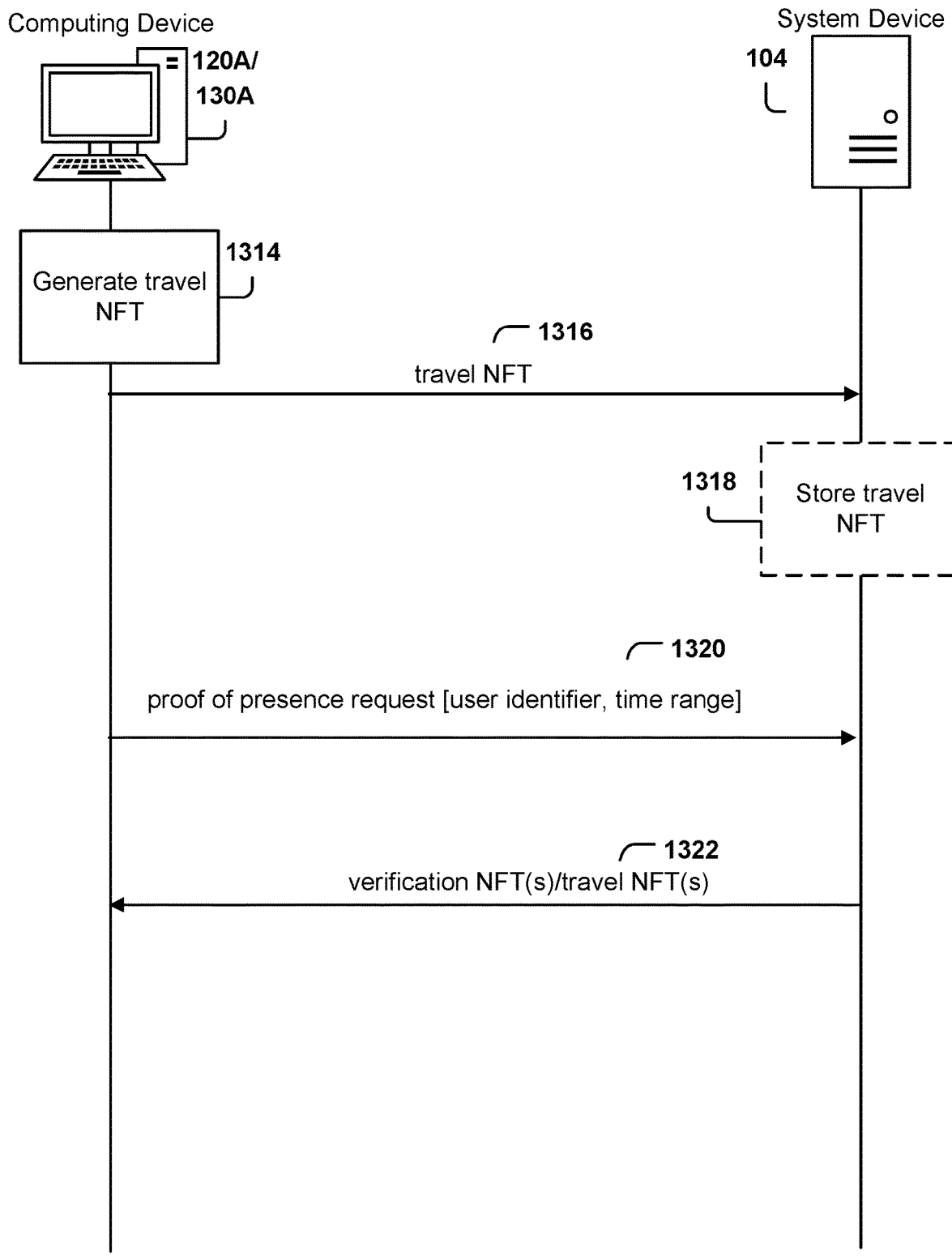

FIGS. 13A-13B show a swim lane diagram illustrating example operations (e.g., as described above in connection with FIGS. 9-11) performed by components of the environment depicted in FIG. 1 to produce various benefits from example embodiments. In these figures, operations performed by a system device 104 are shown along the vertical line extending from the element labeled "system device," operations performed by either a network connected device 120A or user device 130A are shown along the vertical line extending from the element labeled "computing device." Operations impacting both devices, such as data transmissions between the devices, are shown using arrows extending between these lines. Generally, the operations are ordered temporally with respect to one another. However, it will be appreciated that the operations may be performed in other orders from those illustrated herein.

At operation 1302, a network connected device 120A or user device 130A may process an event generation request. The event generation request may include an asset identifier and one or more authentication credentials. At operation 1304, the network connected device 120A or user device 130A may capture the asset position and timestamp. At operation 1306, the network connected device 120A or user device 130A may perform one or more authentication operations on the event generation request. At operation 1308, the network connected device 120A or user device 130A may generate a verification NFT in an instance the event generation request is authenticated. At operation 1310, the network connected device 120A or user device 130A may provide the verification NFT to the system device 104 for storage in a distributed ledger. At operation 1312, the system device 104 may store the verification NFT in the distributed ledger.

At operation 1314, the network connected device 120A or user device 130A may generate a travel NFT. The travel NFT may be generated in response to a trigger event. At operation 1316, the network connected device 120A or user device 130A may provide the travel NFT to the system device 104 for storage in a distributed ledger. At operation 1318, the system device 104 may store the travel NFT in the distributed ledger. At operation 1320, the network connected device 120A or user device 130A may generate and provide a proof of presence to the system device 104. The proof of presence request may include an asset identifier and a time range. At operation 1322, the network connected device 120A or user device 130A may receive one or more verification NFTs and/or travel NFTs from the system device 104.

As described above, example embodiments provide methods and apparatuses for a centralized system capable of accurately and reliably establishing a user proof of presence using verification NFTs and/or travel NFTs. Example embodiments allow for the conservation of network bandwidth by eliminating the need to request user interaction data from multiple sources in order to establish a proof of presence. Some embodiments of the present disclosure ease the manual burden on assets by automatically generating event generation requests in response to a trigger event and/or automatically generating travel NFTs in response to an event generation trigger.

Furthermore, example embodiments lead to improvements in the security and reliability of processes for establishing an asset proof of presence by leveraging the immutable nature of NFTs and performing authentication operations prior to generating verification NFTs. As such, only NFTs which are authenticated are generated and then stored on a distributed ledger, such as on a blockchain, where they cannot be modified or altered. In particular, NFTs may include information for a particular event generation request which verification relates to a request to generate a verification NFT. The verification NFT may be generated in an instance one or more user credentials associated with a requesting user are authenticated. Travel NFTs may include information related to a particular time window (e.g., an 8 hour time window) such that information related to multiple event generation request and/or verification NFTs may be included in a travel NFT.

As such, example embodiments contemplated above provide technical solutions that solve real-world problems faced when attempting to provide a reliable proof of presence history for an asset.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method for generating a verification non-fungible token and a travel non-fungible token, the computer-implemented method comprising:

receiving, by communications hardware, an event generation request, wherein the event generation request comprises at least an asset identifier and one or more authentication credentials;

in response to receiving the event generation request, capturing, by non-fungible token generation circuitry, an asset position and a timestamp;

performing, by authentication circuitry, one or more authentication operations on the event generation request based on the asset identifier and the one or more authentication credentials; and in an instance in which the one or more authentication operations authenticates the event generation request:
generating, by the non-fungible token generation circuitry, the verification non-fungible token for the asset identifier,
generating, by the non-fungible token generation circuitry, the travel non-fungible token, wherein the travel non-fungible token comprises information pertaining to the verification non-fungible token and one or more other verification non-fungible tokens that occurred within a defined time window, and
storing, by the communications hardware, the verification non-fungible token and the travel non-fungible token in an associated distributed ledger.

2. The computer-implemented method of claim 1, wherein the computer-implemented method further comprises:

querying, by the non-fungible token generation circuitry, a requesting device map database for a device location based the event generation request; and determining, by the non-fungible token generation circuitry, the asset position based on the device location.

3. The computer-implemented method of claim 1, wherein:

the event generation request further comprises device coordinates corresponding to an associated user device; and determining, by the non-fungible token generation circuitry, the asset position based on the device coordinates.

4. The computer-implemented method of claim 1, wherein the computer-implemented method further comprises:

providing, by the communications hardware, one or more verification non-fungible tokens in response to a proof of presence request, wherein the proof of presence request includes an indication of the asset identifier and a time range.

5. The computer-implemented method of claim 1, wherein authenticating the event generation request further comprises:

identifying, by the authentication circuitry, an asset profile based on the asset identifier;

determining, by the authentication circuitry, an overall attribute similarity score for the event generation request, wherein the overall attribute similarity score is determined based on a comparison of one or more of the one or more authentication credentials described by the event generation request and one or more stored credentials associated with the asset profile;

determining, by the authentication circuitry, whether the overall attribute similarity score satisfies one or more overall attribute similarity score thresholds; and in response to determining that the overall attribute similarity score satisfies the one or more overall attribute similarity score thresholds, authenticating, by the authentication circuitry, the event generation request.

6. The computer-implemented method of claim 1, wherein the computer-implemented method further comprises generating, by the non-fungible token generation circuitry, a payload for the verification non-fungible token, wherein the payload comprises the asset position, the asset identifier, and the timestamp associated with the event generation request.

7. The computer-implemented method of claim 6, wherein the payload of the verification non-fungible token further comprises an indication of the one or more authentication credentials.

8. The computer-implemented method of claim 7, wherein the computer-implemented method further comprises one or more of:
   encrypting, by the non-fungible token generation circuitry, the indication of the one or more authentication credentials using one or more encryption techniques, or
   tokenizing, by the non-fungible token generation circuitry, the indication of the one or more authentication credentials using one or more tokenization techniques.

9. The computer-implemented method of claim 1, wherein the computer-implemented method further comprises:
   in an instance in which the one or more authentication operations fails to authenticate the event generation request:
      providing, by the communications hardware, one or more potential fraud alerts.

10. The computer-implemented method of claim 1, wherein the computer-implemented method further comprises:
   receiving, by the communications hardware, an event generation trigger; and
   generating, by the non-fungible token generation circuitry, payload data based on information pertaining to one or more verification non fungible tokens, wherein the travel non-fungible token is generated based on the payload data.

11. The computer-implemented method of claim 10, wherein the computer-implemented method further comprises:
   aggregating, by the non-fungible token generation circuitry, information pertaining to the one or more verification non fungible tokens corresponding to the asset identifier which occurred within a corresponding time window associated with the event generation trigger; and
   generating, by the non-fungible token generation circuitry, the payload data based on the aggregated information.

12. An apparatus for generating a verification non-fungible token and a travel non-fungible token, the apparatus comprising:
   communications hardware configured to receive an event generation request, wherein the event generation request comprises at least an asset identifier and one or more authentication credentials;
   non-fungible token generation circuitry configured to in response to receiving the event generation request, capture an asset position and a timestamp; and
   authentication circuitry configured to perform one or more authentication operations on the event generation request based on the asset identifier and the one or more authentication credentials,
   wherein the non-fungible token generation circuitry is further configured to, in an instance in which the one or more authentication operations authenticates the event generation request:
      generate the verification non-fungible token for the asset identifier, and
      generate the travel non-fungible token, wherein the travel non-fungible token comprises information pertaining to the verification non-fungible token and one or more other verification non-fungible tokens that occurred within a defined time window,
   wherein the communications hardware is further configured to store the verification non-fungible token and the travel non-fungible token in an associated distributed ledger.

13. The apparatus of claim 12, wherein the non-fungible token generation circuitry is further configured to:
   query a requesting device map database for a device location based the event generation request; and
   determine the asset position based on the device location.

14. The apparatus of claim 12, wherein:
   the event generation request further comprises device coordinates corresponding to an associated user device; and
   the non-fungible token generation circuitry is further configured to determine the asset position based on the device coordinates.

15. The apparatus of claim 12, wherein the communications hardware is further configured to provide one or more verification non-fungible tokens in response to a proof of presence request, wherein the proof of presence request includes an indication of the asset identifier and a time range.

16. The apparatus of claim 12, wherein the authentication circuitry is further configured to:
   identify an asset profile based on the asset identifier;
   determine an overall attribute similarity score for the event generation request, wherein the overall attribute similarity score is determined based on a comparison of one or more of the one or more authentication credentials described by the event generation request and one or more stored credentials associated with the asset profile;
   determine whether the overall attribute similarity score satisfies one or more overall attribute similarity score thresholds; and
   in response to determining that the overall attribute similarity score satisfies the one or more overall attribute similarity score thresholds, authenticate the event generation request.

17. The apparatus of claim 12, wherein the non-fungible token generation circuitry is further configured to generate a payload for the verification non-fungible token, wherein the payload comprises the asset position, the asset identifier, and the timestamp associated with the event generation request.

18. The apparatus of claim 17, wherein the payload of the verification non-fungible token further comprises an indication of the one or more authentication credentials.

19. The apparatus of claim 18, wherein the non-fungible token generation circuitry is further configured to at least:
   encrypt the indication of the one or more authentication credentials using one or more encryption techniques, or
   tokenize the indication of the one or more authentication credentials using one or more tokenization techniques.

20. A computer program product for generating a verification non-fungible token and a travel non-fungible token, the computer program product comprising at least one non-transitory computer-readable storage medium storing software instructions that, when executed, cause an apparatus to:
- receive an event generation request, wherein the event generation request comprises at least an asset identifier and one or more authentication credentials;
- in response to receiving the event generation request, capture by non-fungible token generation circuitry, an asset position and a timestamp;
- perform one or more authentication operations on the event generation request based on the asset identifier and the one or more authentication credentials; and
- in an instance in which the one or more authentication operations authenticates the event generation request:
  - generate the verification non-fungible token for the asset identifier,
  - generate the travel non-fungible token, wherein the travel non-fungible token comprises information pertaining to the verification non-fungible token and one or more other verification non-fungible tokens that occurred within a defined time window, and
  - store the verification non-fungible token and the travel non-fungible token in an associated distributed ledger.

* * * * *